(12) United States Patent
Totani et al.

(10) Patent No.: US 11,570,394 B2
(45) Date of Patent: *Jan. 31, 2023

(54) VIRTUAL IMAGE DISPLAY APPARATUS AND VIDEO DEVICE UNIT MANUFACTURING METHOD

(71) Applicant: SEIKO EPSON CORPORATION, Tokyo (JP)

(72) Inventors: Takahiro Totani, Suwa (JP); Masayuki Takagi, Matsumoto (JP); Yoshitaka Hama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,614

(22) Filed: Mar. 19, 2021

(65) Prior Publication Data
US 2021/0227171 A1 Jul. 22, 2021

Related U.S. Application Data

(60) Continuation of application No. 16/853,801, filed on Apr. 21, 2020, now Pat. No. 10,986,303, which is a
(Continued)

(30) Foreign Application Priority Data

Feb. 15, 2016 (JP) ................................ 2016-025615
Sep. 30, 2016 (JP) ................................ 2016-192990

(51) Int. Cl.
*H04N 5/64* (2006.01)
*G02B 27/01* (2006.01)
(Continued)

(52) U.S. Cl.
CPC ........... *H04N 5/64* (2013.01); *G02B 27/0176* (2013.01); *G03B 21/16* (2013.01); *H04N 9/30* (2013.01)

(58) Field of Classification Search
CPC ........ H04N 5/64; H04N 9/30; G02B 27/0176; G02B 27/017; G02B 2027/0178; G03B 21/16; H05K 7/20954
See application file for complete search history.

(56) References Cited

U.S. PATENT DOCUMENTS 6,259,423 B1  7/2001 Tokito et al.
6,394,608 B1 *  5/2002 Shiraishi .............. H04N 9/3141
                                                           353/57
(Continued)

FOREIGN PATENT DOCUMENTS

JP    2013-048394 A    3/2013
JP    2014-191013 A    10/2014
WO    2015/083316 A1   6/2015

OTHER PUBLICATIONS

Nov. 17, 2017 Office Action issued in U.S. Appl. No. 15/419,432.
May 15, 2018 Office Action issued in U.S. Appl. No. 15/419,432.
Sep. 21, 2020 Office Action issued in U.S. Appl. No. 16/853,801.

*Primary Examiner* — Michael E Teitelbaum
(74) *Attorney, Agent, or Firm* — Oliff PLC

(57) ABSTRACT

An image display device is a self-luminous type device including a light emitting portion, and a casing portion of a display device unit has a heat dissipating structure portion through which a part of the image display device is exposed for heat dissipation. In manufacturing the display device unit, when performing simple and reliable assembly while securing a high heat dissipation characteristic, for example, by using characteristics of a silicon substrate, high accurate positioning is performed in a display device positioning portion.

6 Claims, 22 Drawing Sheets

Related U.S. Application Data continuation of application No. 16/299,504, filed on Mar. 12, 2019, now Pat. No. 10,674,108, which is a division of application No. 15/419,432, filed on Jan. 30, 2017, now Pat. No. 10,271,003.

(51) Int. Cl.
*G03B 21/16* (2006.01)
*H04N 9/30* (2006.01)

(56) References Cited

U.S. PATENT DOCUMENTS

| | | | |
|---|---|---|---|
| 6,961,165 B2 | 11/2005 | Uehara | |
| 8,248,219 B2 | 8/2012 | Sato et al. | |
| 9,146,453 B2 | 9/2015 | Kasugai et al. | |
| 10,271,003 B2* | 4/2019 | Totani | G02B 27/0176 |
| 10,674,108 B2* | 6/2020 | Totani | H04N 5/64 |
| 10,986,303 B2* | 4/2021 | Totani | G02B 27/0176 |
| 2009/0104989 A1* | 4/2009 | Williams | G02F 1/133602 463/31 |
| 2010/0295670 A1 | 11/2010 | Sato et al. | |
| 2011/0227487 A1* | 9/2011 | Nichol | G02B 6/0018 362/613 |
| 2012/0250352 A1 | 10/2012 | Hirasawa | |
| 2013/0012311 A1* | 1/2013 | Cornell | G07F 17/3223 463/31 |
| 2013/0118550 A1 | 5/2013 | Sahin | |
| 2014/0326974 A1 | 11/2014 | Yamazaki et al. | |
| 2015/0002824 A1 | 1/2015 | Kasugai et al. | |
| 2015/0348855 A1 | 12/2015 | Hiroki et al. | |
| 2016/0041395 A1 | 2/2016 | Yajima | |
| 2017/0045740 A1 | 2/2017 | Hirata et al. | |
| 2017/0048503 A1 | 2/2017 | Hirata et al. | |
| 2017/0097509 A1 | 4/2017 | Yoshida | |
| 2017/0237935 A1* | 8/2017 | Totani | H04N 9/30 348/802 |
| 2018/0017798 A1 | 1/2018 | Yoshida | |
| 2018/0024368 A1 | 1/2018 | Takagi et al. | |
| 2020/0252575 A1* | 8/2020 | Totani | H04N 5/64 |
| 2021/0027583 A1* | 1/2021 | Cuddy | G07F 17/323 |

* cited by examiner

FIG.6A
FIG.6B
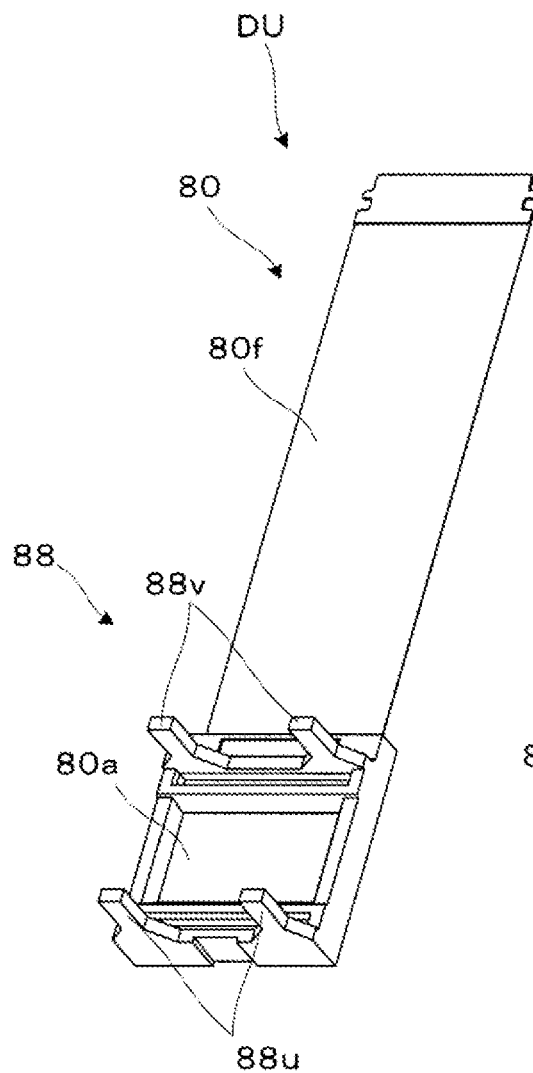
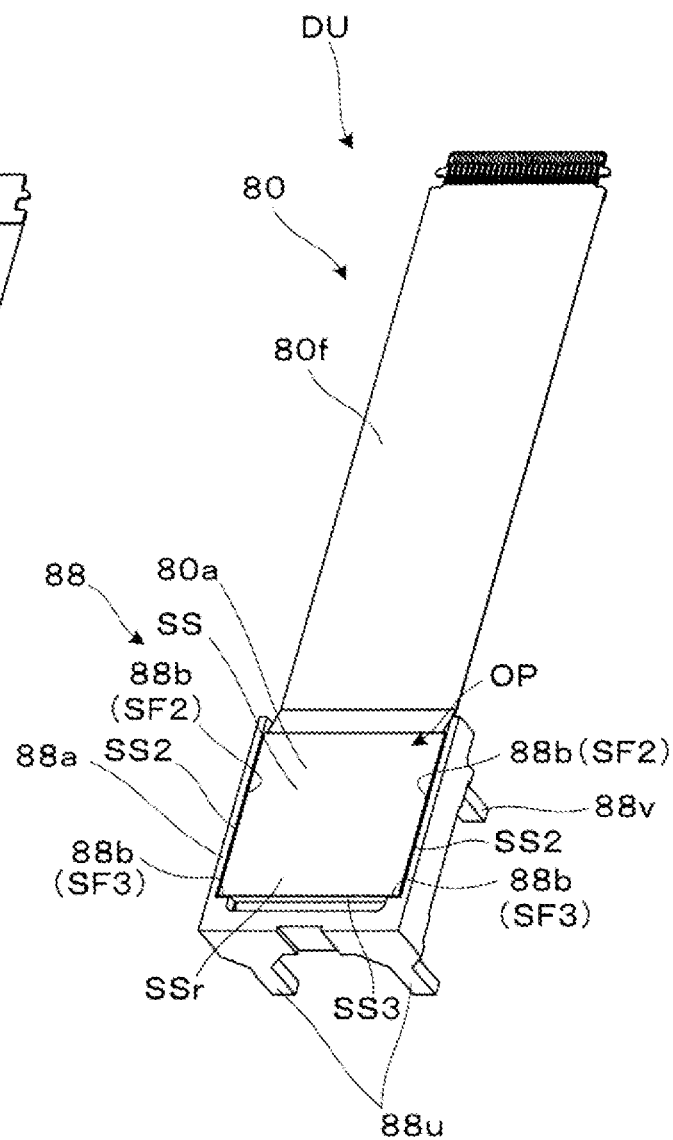

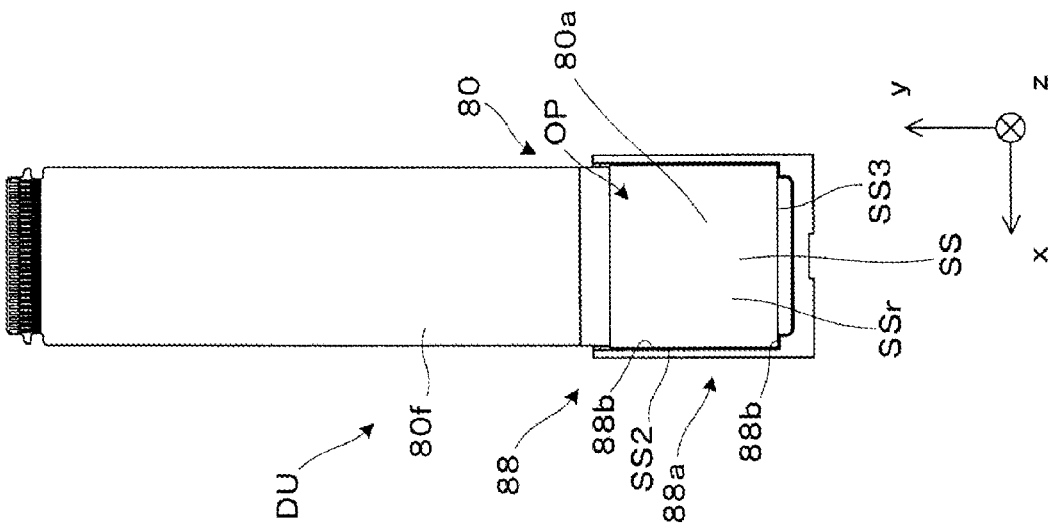
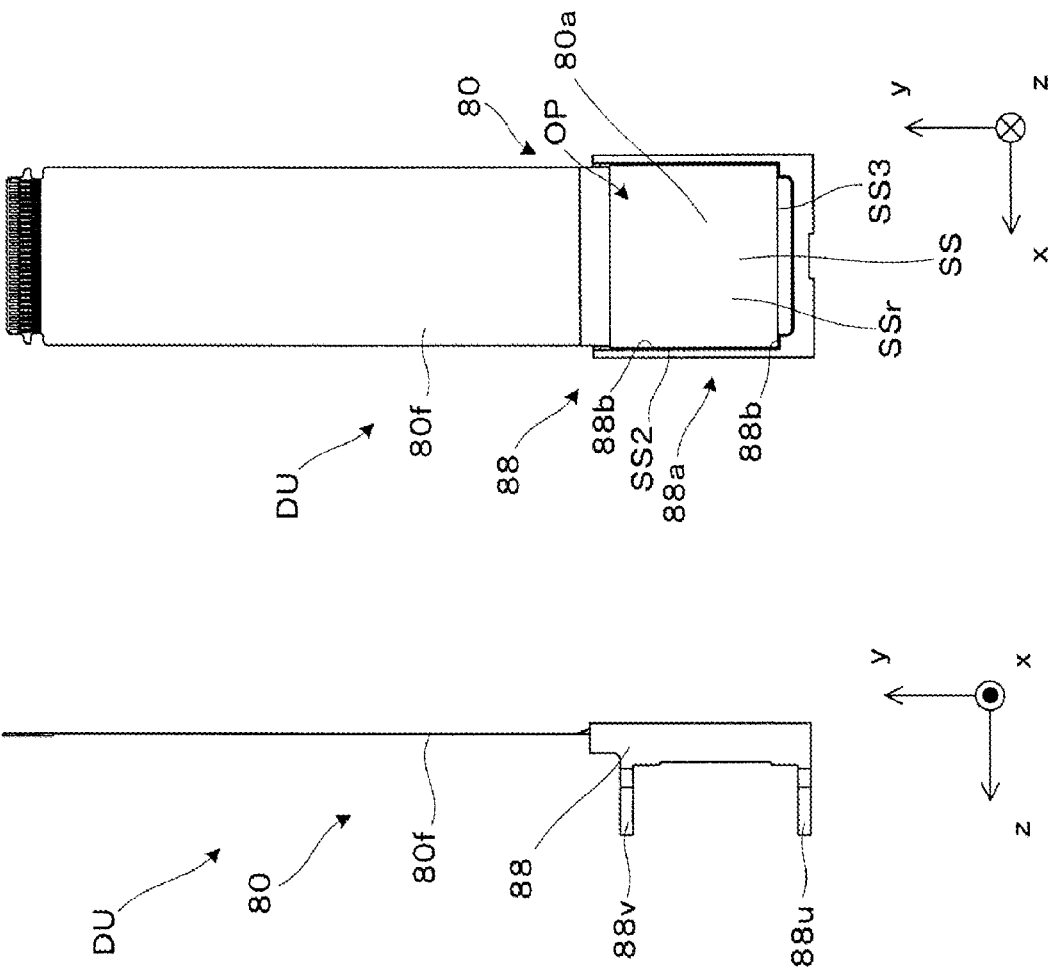
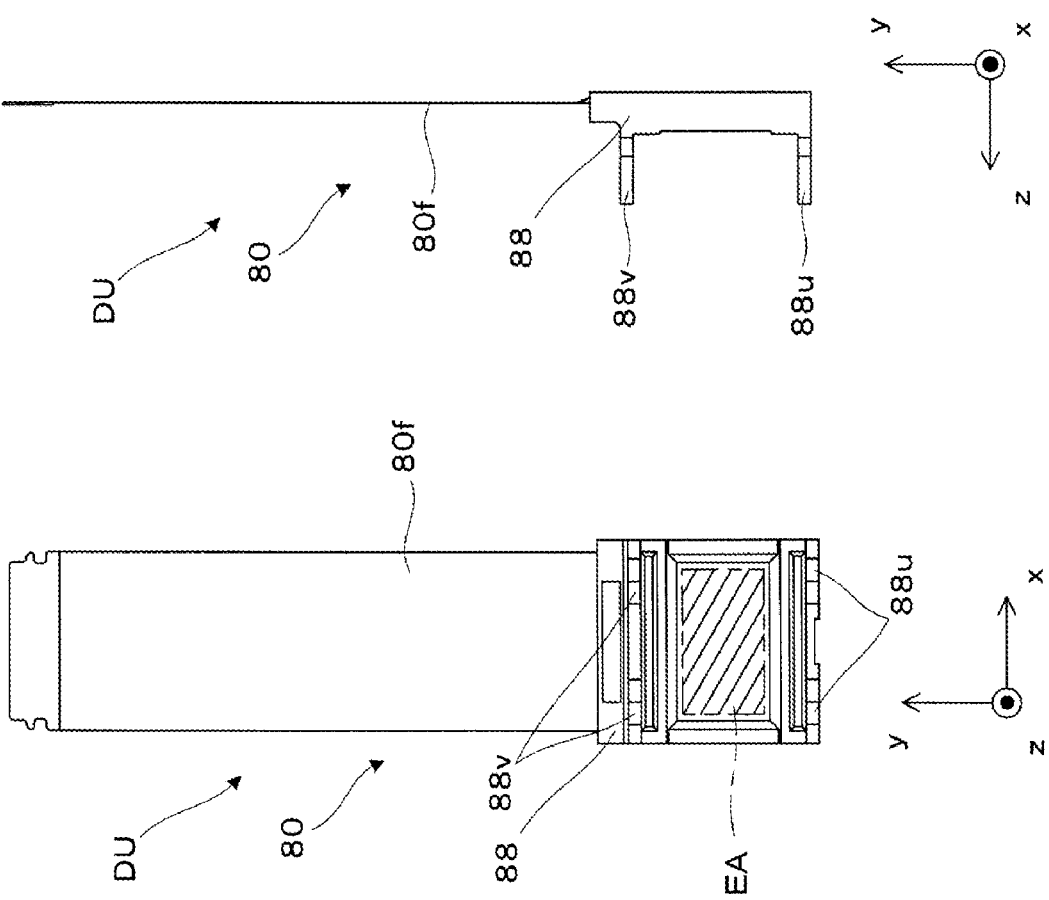

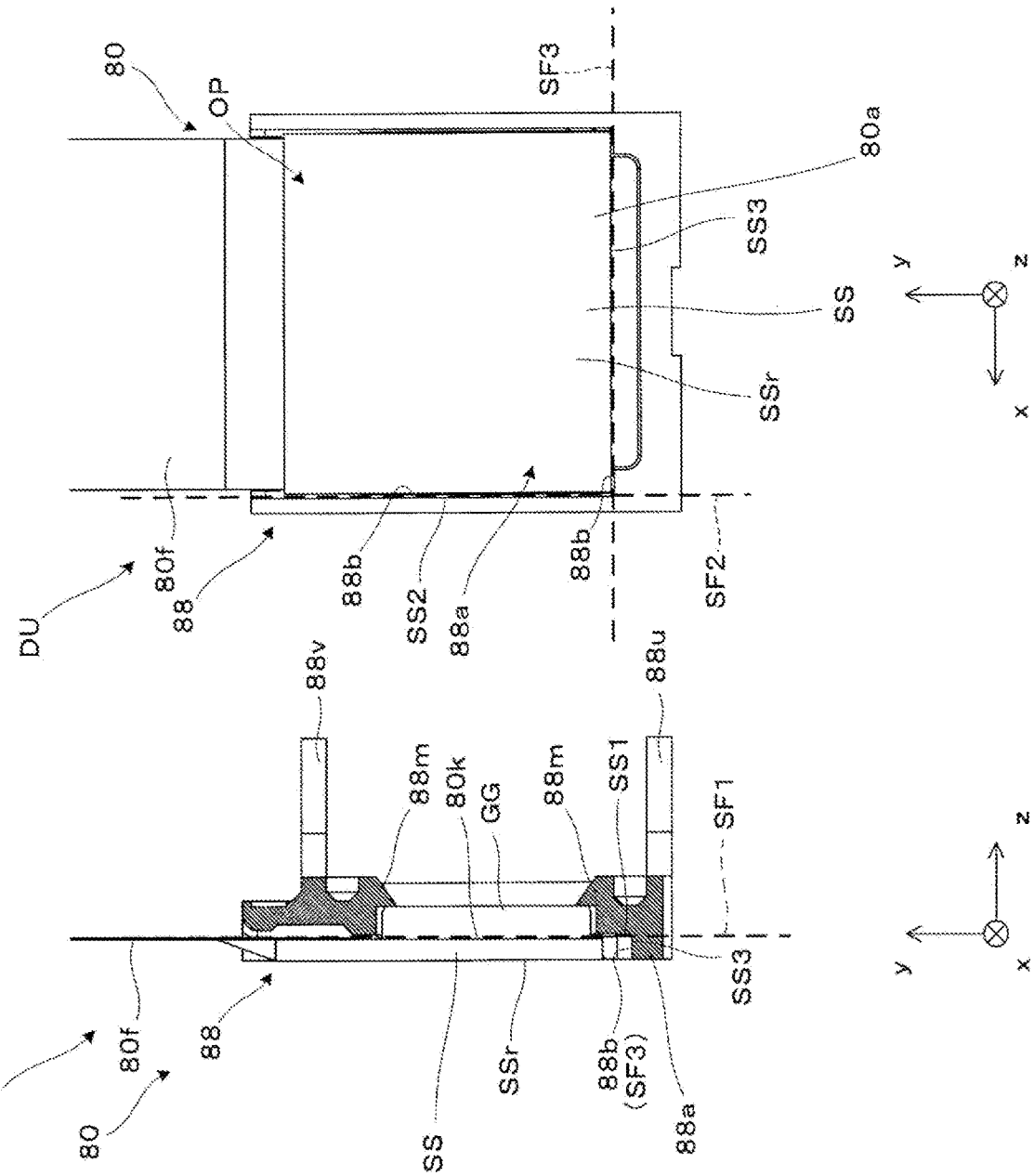

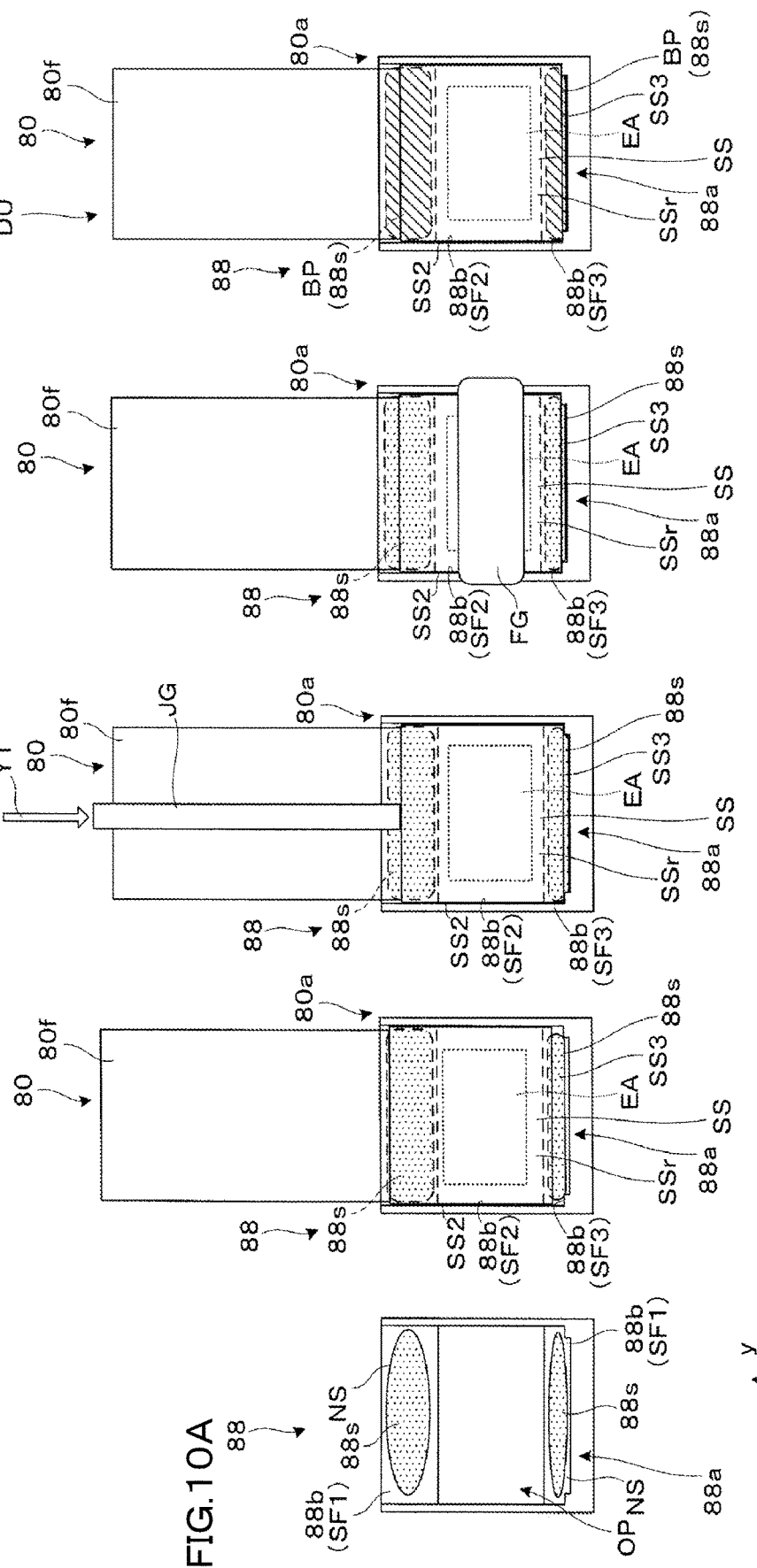

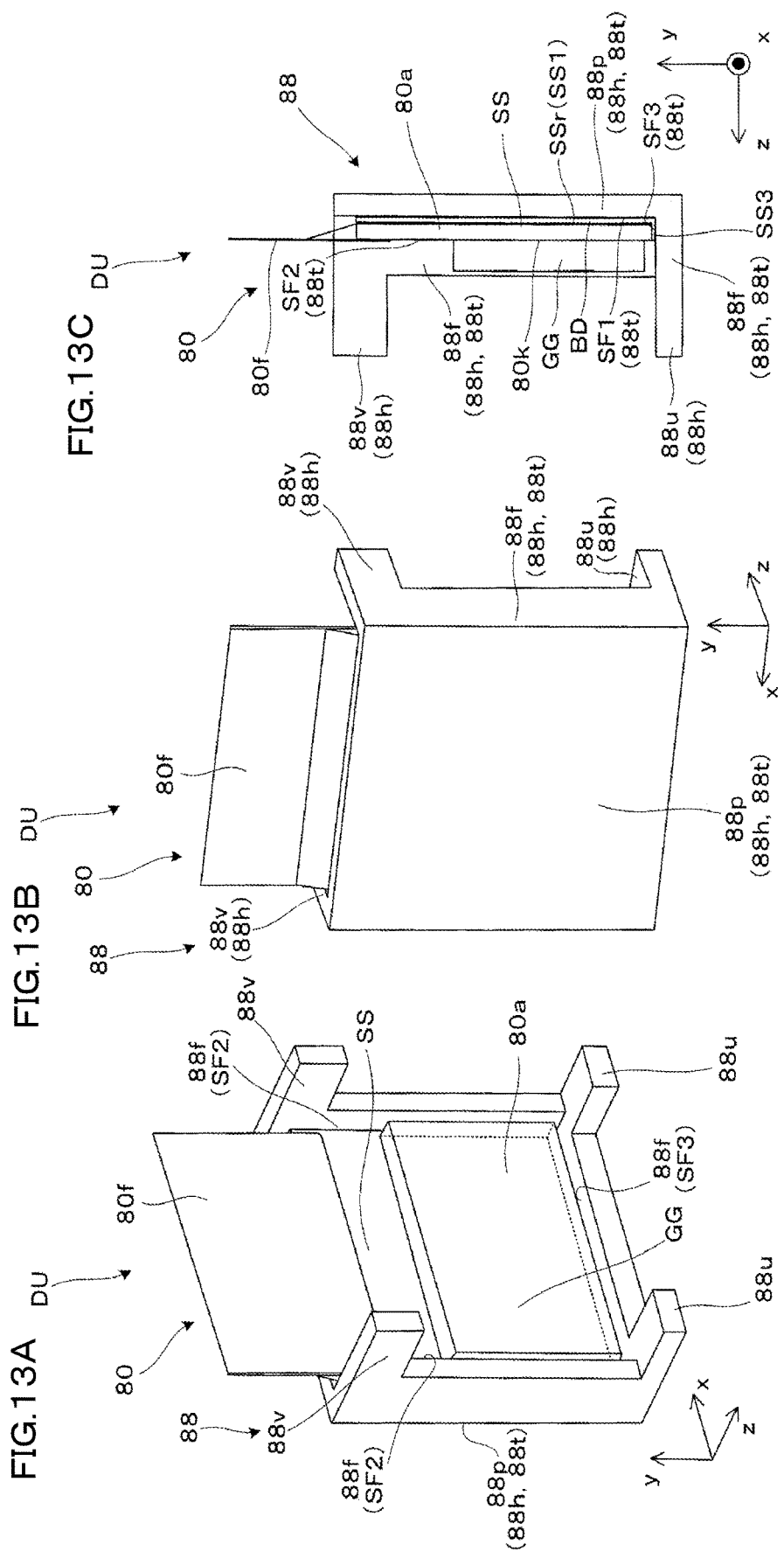

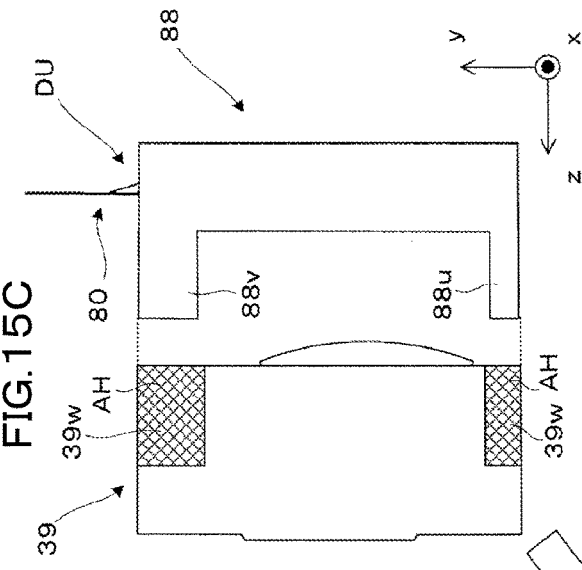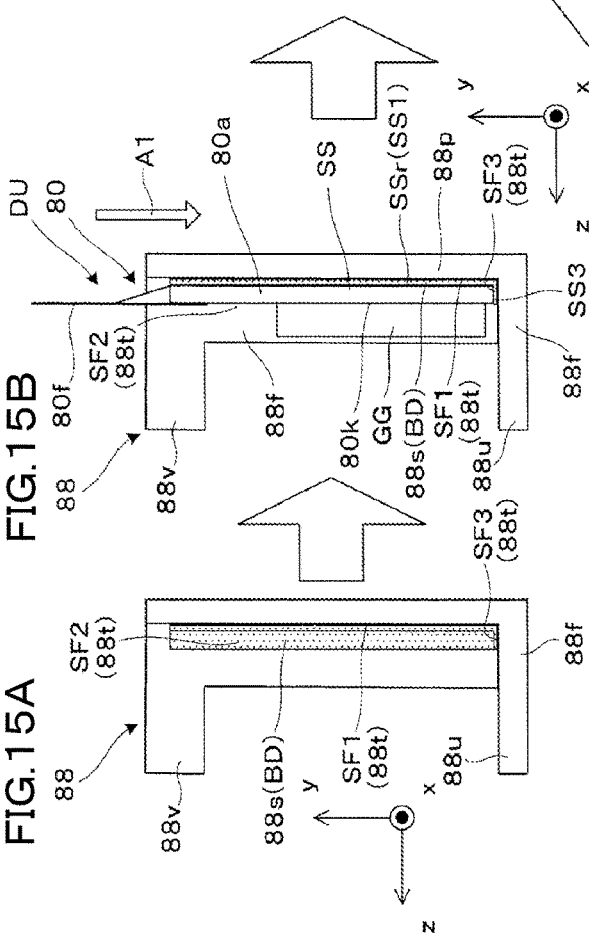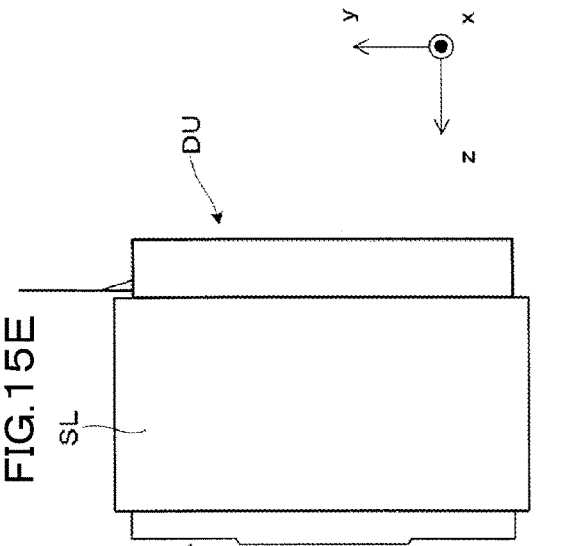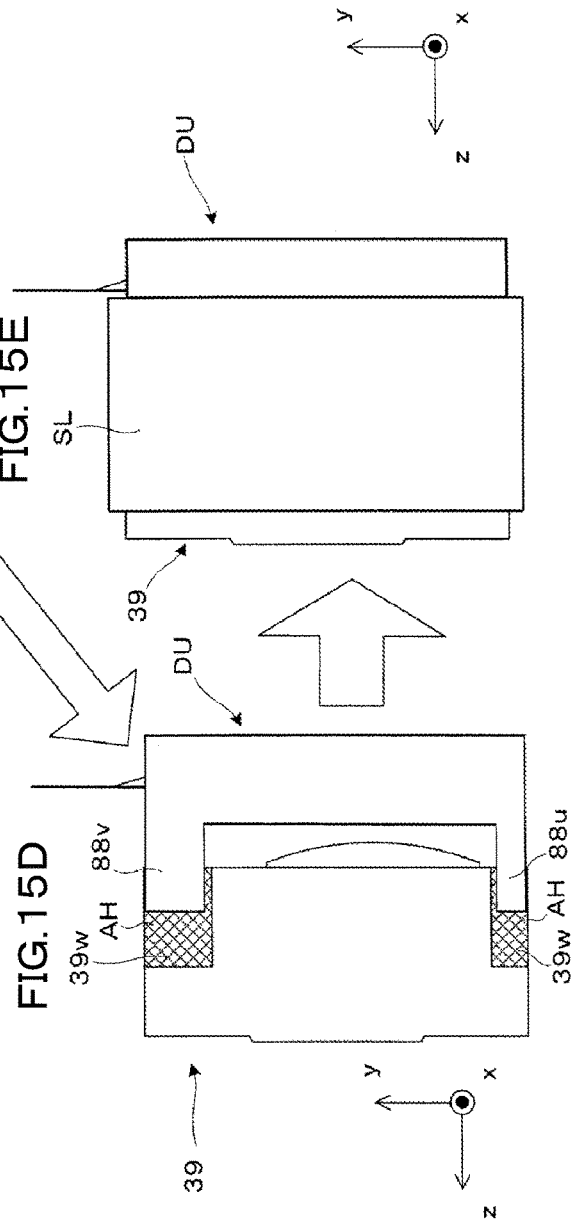

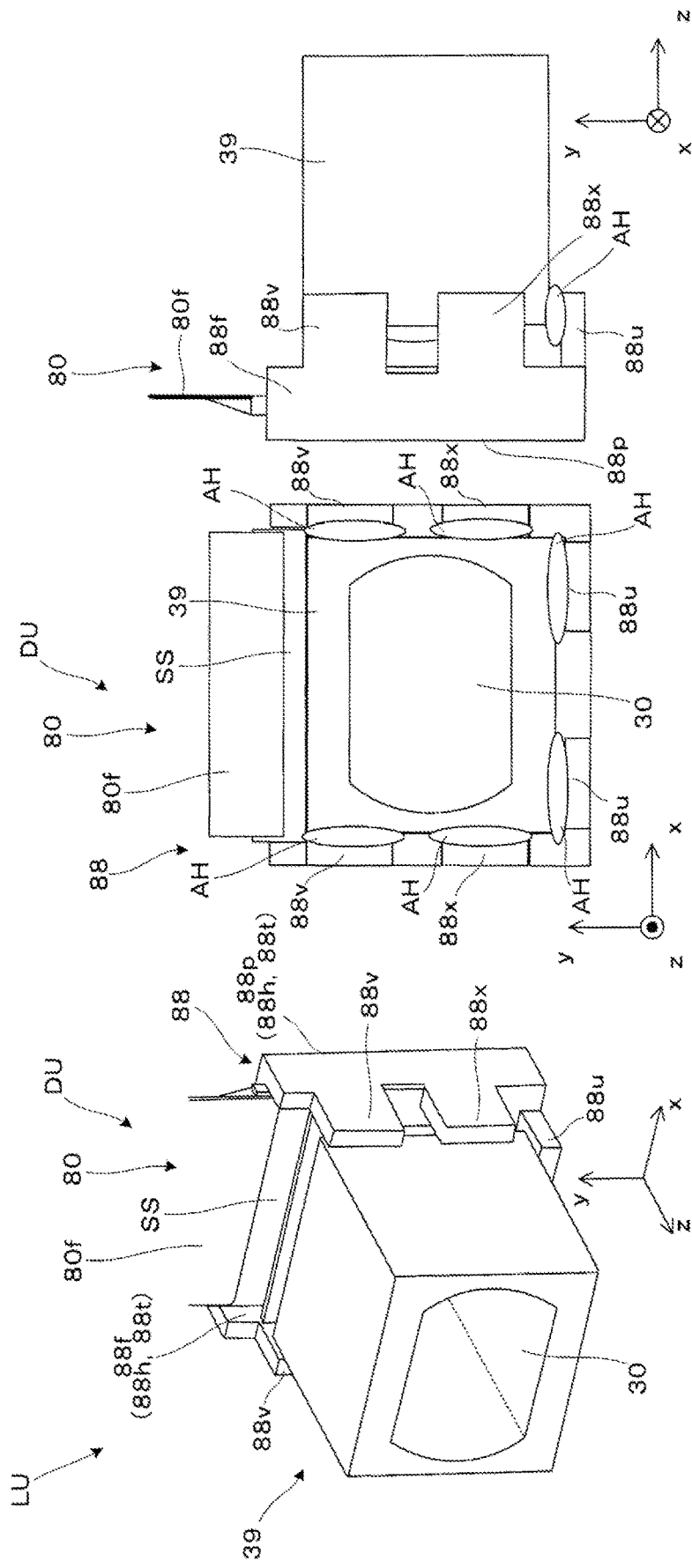

VIRTUAL IMAGE DISPLAY APPARATUS AND VIDEO DEVICE UNIT MANUFACTURING METHOD

This application is a continuation application of U.S. patent application Ser. No. 16/853,801, filed on Apr. 21, 2020, which in turn is a continuation application of U.S. patent application Ser. No. 16/299,504, filed on Mar. 12, 2019, which in turn is a divisional application of U.S. patent application Ser. No. 15/419,432, filed on Jan. 30, 2017, which claims priority to JP 2016-192990, filed Sep. 30, 2016, and JP 2016-025615, also filed Feb. 15, 2016. The disclosures of each of the above are hereby incorporated by reference in their entireties.

BACKGROUND

1. Technical Field

The present invention relates to a virtual image display apparatus and a video device unit manufacturing method that presents a video formed by an image display device or the like to an observer.

2. Related Art

As a virtual image display apparatus such as a head-mounted display (hereinafter, referred to as an HMD) which is mounted in a head portion of an observer, a device in which a liquid crystal display panel is applied to an image display device (video device) or the like is known (for example, JP-A-2014-191013, or the like). In a case where image formation is performed using the liquid crystal display panel, it is necessary that a light source such as a backlight is separately provided and a space for accommodating the light source is provided. In order to realize miniaturization in such a situation, a device having a structure that the liquid crystal display panel is pinched between two casings is known (see JP-A-2014-191013).

On the other hand, in order to satisfy a demand for further miniaturization, a technique that employs a self-luminous type video device in which a separate light source is not necessary may be considered.

However, for example, since a self-luminous type video device such as an organic EL (OLED) panel has a structure in which a light emitting source is provided in a panel substrate and a driver IC for driving, a power source element, or the like is provided therein, internal temperature easily rises. Particularly, in the case of such an organic EL, it is considered that performance degradation or life shortening becomes noticeable due to increase in internal temperature as characteristics thereof.

SUMMARY

An advantage of some aspects of the invention is to provide a virtual image display apparatus and a video device unit manufacturing method capable of achieving weight reduction and miniaturization of an overall device using a self-luminous type video device, maintaining performance of the video device, and forming an excellent image.

A virtual image display apparatus according to a first aspect of the invention includes: a video device that includes a light emitting portion that generates video light; and a casing portion that accommodates the video device, in which the casing portion has a heat dissipating structure portion through which a side of the video device opposite to a side thereof where video light is emitted is exposed for heat dissipation.

In the virtual image display apparatus, since the virtual image display apparatus is a self-luminous type device that includes a light emitting portion for generating video light in a video device and does not need a separate light source, it is possible to achieve weight reduction and miniaturization of the video device, and to achieve weight reduction and miniaturization of the entirety of the virtual image display apparatus. Further, since the casing portion has the heat dissipating structure portion through which a part of the video device is exposed for heat dissipation, it is possible to reduce increase in internal temperature of the video device. Furthermore, although the video device is a self-luminous type, it is possible to avoid performance degradation or life shortening due to increase in internal temperature, and to achieve excellent image formation.

A video display unit according to a first aspect of the invention includes: a video device that includes a light emitting portion that generates video light; and a casing portion that accommodates the video device, in which the casing portion has a heat dissipating structure portion through which a side of the video device opposite to a side thereof where video light is emitted is exposed for heat dissipation and a video device positioning portion that determines an accommodation position of the video device by being in contact with a place other than a place where the video device is exposed.

In the video device unit, since the video device unit is a self-luminous type device that includes a light emitting portion for generating video light in a video device and does not need a separate light source, it is possible to achieve weight reduction and miniaturization of the video device, and to achieve weight reduction and miniaturization of the video device unit. Further, since the casing portion has the heat dissipating structure portion through which a part of the video device is exposed for heat dissipation, it is possible to reduce increase in internal temperature of the video device. Furthermore, although the video device is a self-luminous type, it is possible to avoid performance degradation or life shortening due to increase in internal temperature, and to achieve excellent image formation.

A video device unit manufacturing method according to a first aspect of the invention is a manufacturing method of a video device unit including a video device that includes a light emitting portion that generates video light and a casing portion that accommodates the video device, in which the casing portion includes a heat dissipating structure portion through which a side of the video device opposite to a side thereof where video light is emitted is exposed for heat dissipation and a video device positioning portion that is in contact with a place other than a place where the video device is exposed and determines an accommodation position of the video device. The method includes: applying an adhesive for fixing the video device in the video device positioning portion of the casing portion; and positioning the video device and the casing portion and fixing the video device and the casing portion using the adhesive with the video device being exposed through the heat dissipating structure portion.

In the video device unit manufacturing method, in manufacturing a self-luminous type video device unit capable of achieving excellent image formation by avoiding performance degradation or life shortening due to increase in internal temperature while achieving weight reduction and miniaturization, it is possible to achieve simple and reliable assembly while securing a high heat dissipation characteristic in a heat dissipating structure portion.

A virtual image display apparatus according to a second aspect of the invention includes: a video device that includes a light emitting portion that generates video light; and a casing portion that accommodates the video device, in which the casing portion has a thermal conductive member that conducts heat of the light emitting portion in contact with the video device.

In the virtual image display apparatus, since the virtual image display apparatus is a self-luminous type device that includes a light emitting portion for generating video light in a video device and does not need a separate light source, it is possible to achieve weight reduction and miniaturization of the video device, and to achieve weight reduction and miniaturization of the entirety of the virtual image display apparatus. Further, since the casing portion has the thermal conductive member that conducts heat of the light emitting portion in contact with the video device for heat dissipation, it is possible to reduce increase in internal temperature of the video device. Furthermore, although the video device is a self-luminous type, it is possible to avoid performance degradation or life shortening due to increase in internal temperature, and to achieve excellent image formation.

A video device unit according to a second aspect of the invention includes: a video device that includes a light emitting portion that generates video light; and a casing portion that accommodates the video device, in which the casing portion has a thermal conductive member that conducts heat of the light emitting portion in contact with the video device.

In the video device unit, since the virtual image display apparatus is a self-luminous type device that includes a light emitting portion for generating video light in a video device and does not need a separate light source, it is possible to achieve weight reduction and miniaturization of the video device, and to achieve weight reduction and miniaturization of the entirety of the virtual image display apparatus. Further, since the casing portion has the thermal conductive member that conducts heat of the light emitting portion in contact with the video device for heat dissipation, it is possible to reduce increase in internal temperature of the video device. Furthermore, although the video device is a self-luminous type, it is possible to avoid performance degradation or life shortening due to increase in internal temperature, and to achieve excellent image formation.

A video device unit manufacturing method according to a second aspect of the invention is a manufacturing method of a video device unit including a video device that includes a light emitting portion that generates video light and a casing portion that accommodates the video device, in which the casing portion has a thermal conductive member that conducts heat of the light emitting portion in contact with the video device. The method includes: applying an adhesive for fixing the video device in a contact place with the video device of the thermal conductive member; and positioning the video device and the casing portion and fixing the video device and the casing portion using the adhesive with the video device being exposed through the heat dissipating structure portion.

In the video device unit manufacturing method, in manufacturing a self-luminous type video device unit capable of achieving excellent image formation by avoiding performance degradation or life shortening due to increase in internal temperature while achieving weight reduction and miniaturization, it is possible to achieve simple and reliable assembly while securing a high heat dissipation characteristic in a thermal conductive member that forms a casing portion.

BRIEF DESCRIPTION OF THE DRAWINGS

The invention will be described with reference to the accompanying drawings, wherein like numbers reference like elements.

FIG. 6A is a perspective view illustrating an appearance of a display device unit, and FIG. 6B is a perspective view illustrating a state of the display device unit in FIG. 6A when seen from a different angle.

FIG. 7A is a front view of a display device unit, FIG. 7B is a side view thereof, and FIG. 7C is a rear view thereof.

FIGS. 9A and 9B are diagrams illustrating a positioning reference in assembly of a display device unit.

FIGS. 10A to 10E are diagrams illustrating an example of a manufacturing process of a display device unit.

FIG. 13A is a perspective view of a display device unit assembled in a virtual image display apparatus according to a second embodiment, FIG. 13B is another perspective view thereof, and FIG. 13C is a sectional side view thereof.

FIGS. 15A to 15E are diagrams illustrating an example of a manufacturing process of a display device unit and an assembly process of the display device unit and a lens barrel.

FIG. 17A is a perspective view illustrating a state where a display device unit is assembled in a lens barrel built in a virtual image display apparatus according to a fourth embodiment, FIG. 17B is a front view thereof, and FIG. 17C is a side view thereof.

DESCRIPTION OF EXEMPLARY EMBODIMENTS

First Embodiment

Hereinafter, an embodiment of a virtual image display apparatus in which a display device unit which is a video device unit according to a first embodiment of the invention is provided will be described in detail with reference to FIG. 1.

Figure 1:
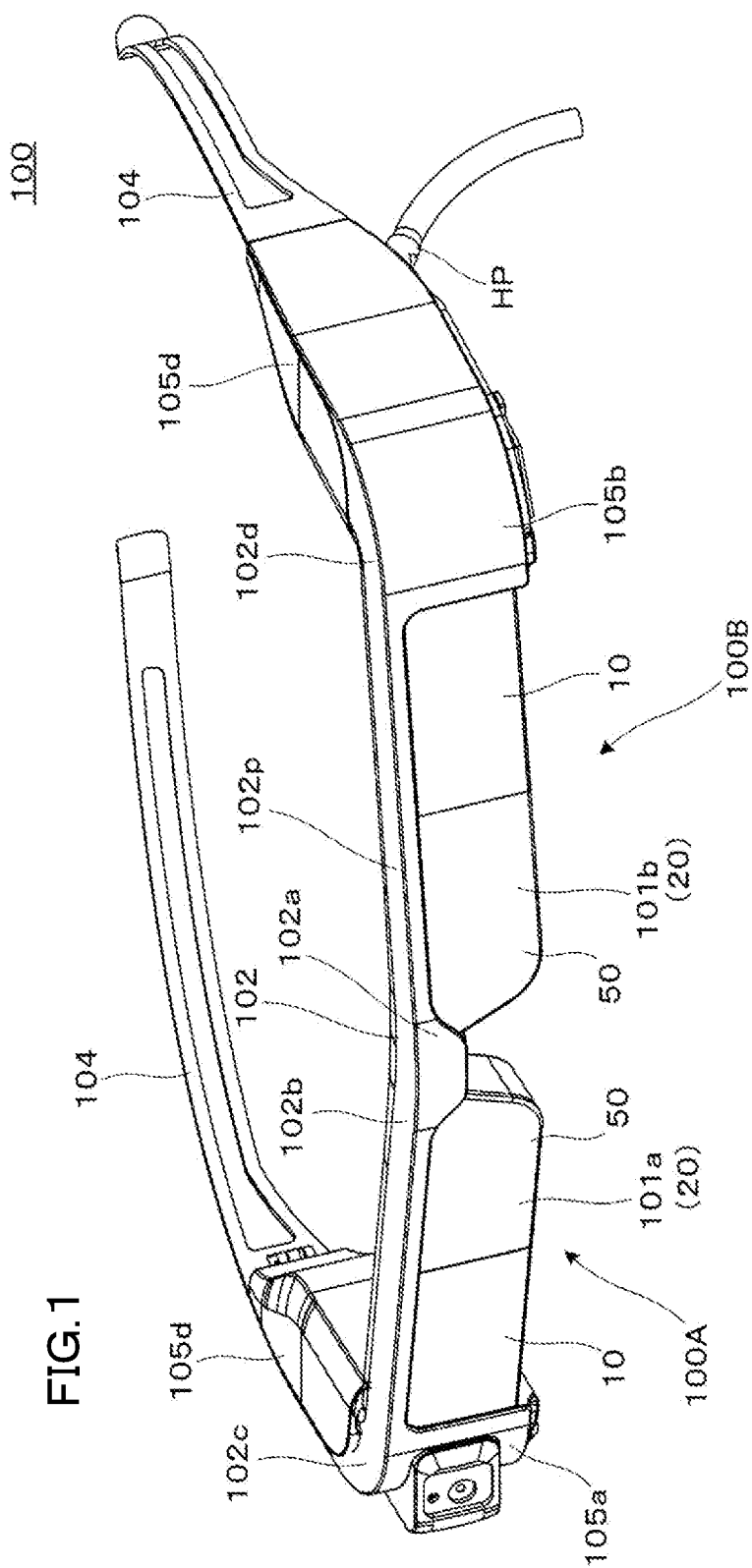
FIG. 1 is a perspective view illustrating an appearance of an example of a virtual image display apparatus according to a first embodiment.

As shown in FIG. 1, a virtual image display apparatus 100 according to this embodiment is a head-mounted display (HMD) having an appearance such as glasses, and may cause an observer or a user who wears the virtual image display apparatus 100 to view image light (video light) based on a virtual image, and may cause the observer to view or observe an external world image in a see-through manner. The virtual image display apparatus 100 includes a first display device 100A, a second display device 100B, and a frame portion 102.

The first display device 100A and the second display device 100B are portions that form virtual images for the right eye and the left eye, respectively, and include first and second optical members 101a and 101b that cover front sides of the observer's eyes in a see-through manner, and first and second image formation main portions 105a and 105b, respectively. As will be described later, each of the first and second image formation main portions 105a and 105b is configured by an optical system for image formation including a display device (video device), a projection lens, and the like, a member that accommodates the optical system, and the like. The display device (video device), the projection lens, and the like are supported and accommodated by being covered by a cover-shaped exterior member 105d. The first and second optical members 101a and 101b are light guide portions that guide video light formed by the first and second image formation main portions 105a and 105b and overlap external world light and video light to be viewed, and form a light guide device. Hereinafter, the first optical member 101a or the second optical member 101b is referred to as a light guide device 20. The first display device 100A and the second display device 100B individually function as a virtual image display apparatus.

The frame portion 102 is a metallic integral part made of an elongated member bent in a U-shape in a plan view. Here, as an example, the frame portion 102 is formed of a magnesium alloy. In other words, the frame portion 102 is configured so that a magnesium frame which is a metallic integral part is a main body portion 102p. Further, the frame portion 102 includes a central portion 102a having a thick structure provided to be connected to both of the first optical member 101a and the second optical member 101b (light guide devices 20 which are a pair of light guide portions), and a support body 102b that extends along the first and second optical members 101a and 101b from the central portion 102a and forms a portion that is bent in a U-shape.

The central portion 102a is pinched between tip end sides of the first and second optical members 101a and 101b, to thereby fix relative positions thereof. In addition, the support body 102b forms first and second peripheral portions 102c and 102d which are portions bent in a U-shape, are connected (assembled) to the first and second optical members 101a and 101b in the first and second peripheral portions 102c and 102d, to strengthen the fixing.

Temples 104 which are string portions that extend backward from right and left ends of the frame portion 102 are provided, and may be supported being in contact with the observer's ears, temples or the like. Further, the first and second image formation body portions 105a and 105b may be added as parts of the temples 104 from the frame portion 102.

Figure 2:
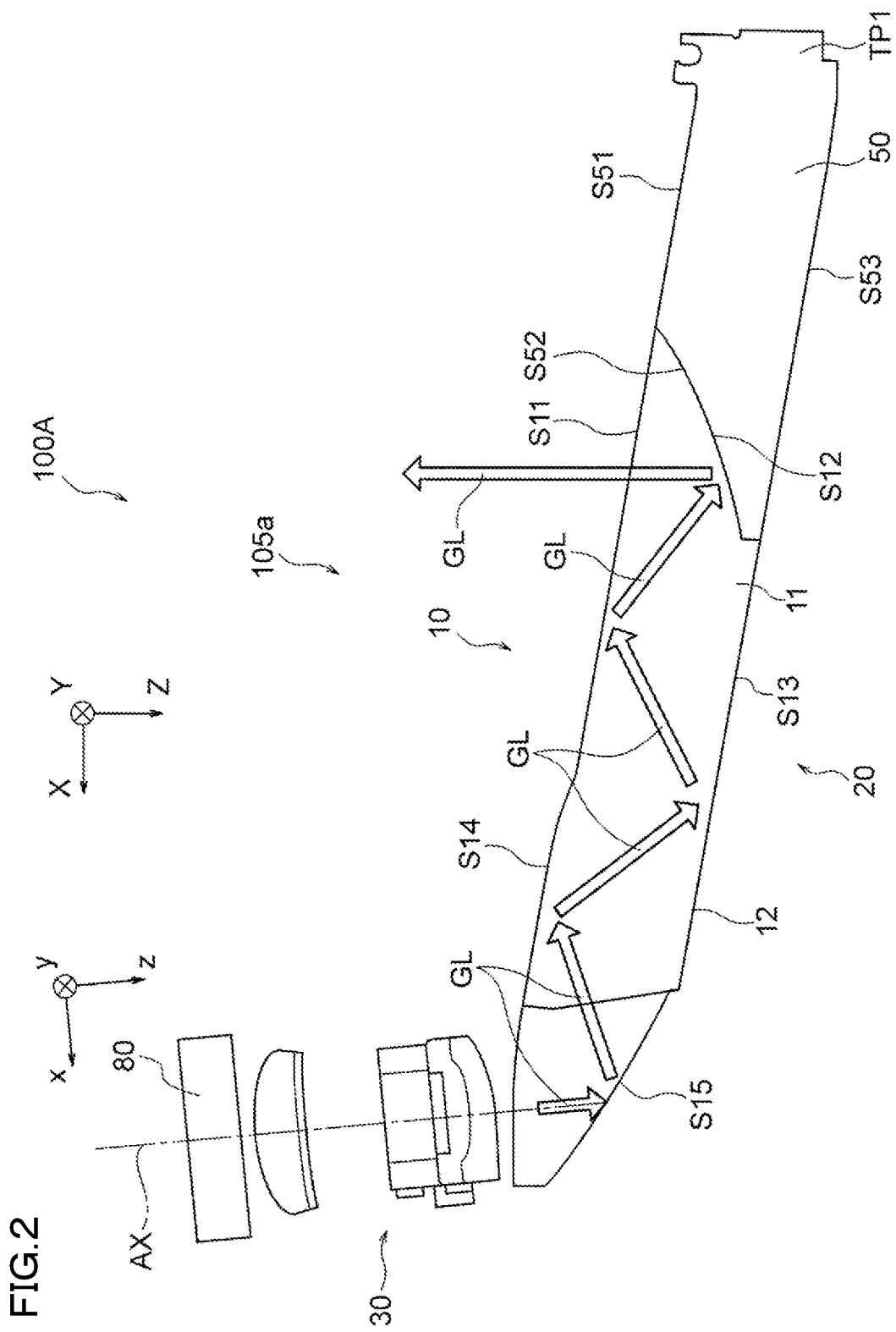
FIG. 2 is a diagram conceptually illustrating an optical path of video light.

Hereinafter, an example of a structure for performing light guiding of video light, and the like in the virtual image display apparatus 100 will be conceptually described with reference to FIG. 2 and the like. Devices for performing light guiding of video light are the first display device 100A and the second display device 100B (see FIG. 1, or the like) as described above, but since the first display device 100A and the second display device 100B have symmetrically the same structures, only the first display device 100A will be described, and description of the second display device 100B will not be repeated. As shown in FIG. 2, the first display device 100A includes an image display device 80 that forms video light, a projection lens 30 for imaging which is accommodated in a lens barrel, and the light guide device 20 (the first optical member 101a) that guides video light passed through the image display device 80 and the projection lens 30. The light guide device 20 is configured by a light guide member 10 for light guiding and see-through, and a light transmitting member 50 for see-through.

The image display device 80 may be formed as a video device (video display device) which is configured by a self-luminous type device such as an organic EL. Further, for example, in addition to the video display device (video device) which is a transmission-type spatial light modulator, the image display device 80 may be configured to include a lighting system (not shown) which is a backlight that emits illumination light to the video display device and a drive controller (not shown) that controls an operation thereof. In this embodiment, the image display device 80 which is the video device is configured to be accommodated in a casing portion to be unitized (modularized), and thus, alignment to the projection lens 30 is performed. Furthermore, a configuration in which the image display device (video device) 80 is accommodated in the casing portion to be unitized (modularized) is referred to as a display device unit (or video device unit).

Figure 3:
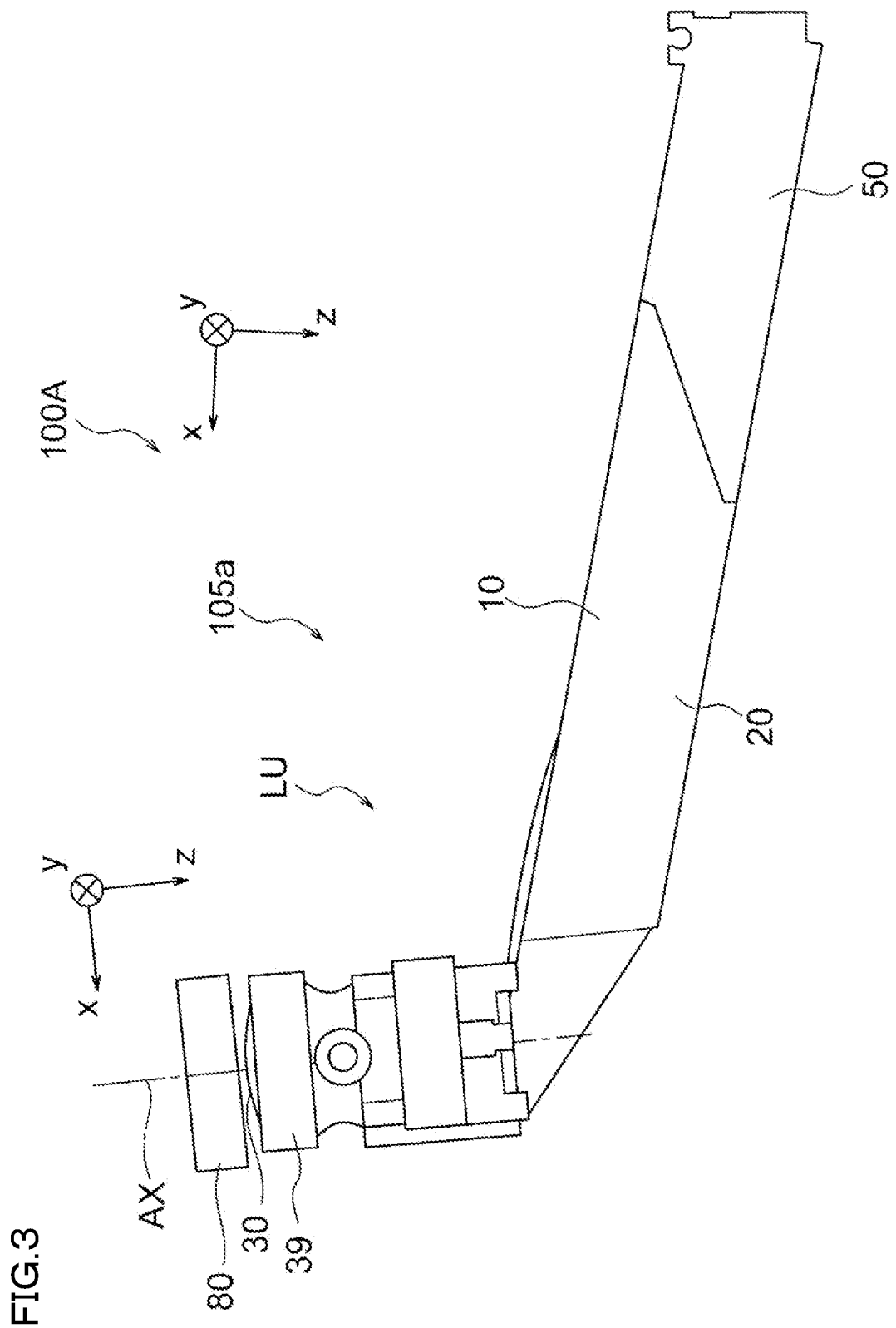
FIG. 3 is a diagram illustrating retention of an optical system (projection lens) by a lens barrel.

The projection lens 30 is a projection optical system that includes plural (for example, three) optical elements (lenses) disposed along an incident-side optical axis AX as components, for example, in which the optical elements are accommodated and supported by a lens barrel 39 as shown in FIG. 3. Each optical element is configured by an aspherical surface lens including both of an aspherical surface which is not axisymmetric (non-axisymmetric aspherical surface) and an aspherical surface which is axisymmetric (axisymmetric aspherical surface), for example, so as to form an intermediate image corresponding to a display image in the light guide member 10 in cooperation with a part of the light guide member 10 that forms the light guide device 20. The projection lens 30 projects video light formed by the image display device 80 toward the light guide device 20 to be incident thereon.

The light guide device 20 is configured by the light guide member 10 for light guiding and see-through, and the light transmitting member 50 for see-through as described above. The light guide member 10 is a part of the light guide device 20 of a prism type and is an integrated member, but as shown in FIG. 2, may be divided into a first light guide portion 11 on a light emitting side and a second light guide portion 12 on a light incident side. The light transmitting member 50 is a member that assists the see-through function of the light guide member 10 (auxiliary optical block), and is integrally fixed to the light guide member 10 to form one light guide device 20. The light guide device 20 is screwed to the lens barrel 39 (see FIG. 3 or the like), for example, and is positioned and fixed to the projection lens 30 with high accuracy. As shown in FIG. 3, a part which is integrally unitized by attaching the projection lens 30 and the light guide device 20 to the lens barrel 39 is referred to as an optical display unit LU.

Returning to FIG. 2, the light guide member 10 includes first to fifth surfaces S11 to S15 as side surfaces having optical functions. Here, the first surface S11 and the fourth surface S14 are continuously adjacent to each other, and the third surface S13 and the fifth surface S15 are continuously adjacent to each other. In addition, the second surface S12 is disposed between the first surface S11 and the third surface S13. A half mirror layer is collaterally provided on the front surface of the second surface S12. The half mirror layer is a reflecting film (that is, semi-transmission type reflecting film) having a light transmitting property, and is formed by forming a metallic reflecting film or a dielectric multilayer film, in which a reflectance with respect to video light is appropriately set.

Hereinafter, an optical path of video light (here, referred to as video light GL) will be schematically described with reference to FIG. 2. The light guide member 10 causes the video light GL to be incident from the projection lens 30, and guides the video light GL toward the eyes of an observer through reflection or the like on the first to fifth surfaces S11 to S15. Specifically, the video light GL from the projection lens 30 is first incident to the fourth surface S14 and then is reflected from the fifth surface S15, is again incident to the fourth surface S14 from the inside and then is totally reflected, is incident to the third surface S13 and then is totally reflected, and then, is incident to the first surface S11 and then is totally reflected. The video light GL which is totally reflected from the first surface S11 is incident to the second surface S12, is partially reflected while partially passing through the half mirror layer provided on the second surface S12, and is again incident to the first surface S11 and passes through the first surface S11. The video light GL passed through the first surface S11 is incident to the eyes of an observer or an equivalent position thereof as substantially parallel light beams. In other words, the observer comes to observe an image using video light which is a virtual image.

As described above, the light transmitting member 50 is integrally fixed to the light guide member 10 to form one light guide device 20, and is a member (auxiliary optical block) that assists the see-through function of the light guide member 10. The light transmitting member 50 includes a first light transmitting surface S51, a second light transmitting surface S52, and a third light transmitting surface S53 as side surfaces having optical functions. The second light transmitting surface S52 is disposed between the first light transmitting surface S51 and the third light transmitting surface S53. The first light transmitting surface S51 is disposed on a surface that extends from the first surface S11 of the light guide member 10, the second light transmitting surface S52 is a curved surface which is bonded to the second surface S12 to be integrated therewith, and the third light transmitting surface S53 is disposed on a surface that extends from the third surface S13 of the light guide member 10.

As described above, the light guide device 20 causes an observer to view video light using the light guide member 10 and causes the observer to an external world image having a small amount of distortion using cooperation of the light guide member 10 and the light transmitting member 50. In other words, light which is incident to a +X side with reference to the second surface S12 of the light guide member 10, in external world light as component light that forms an external world image to be viewed, passes through the third surface S13 and the first surface S11 of the first light guide portion 11, but at this time, since the third surface S13 and the first surface S11 are formed in planes which are approximately parallel to each other (diopter is approximately zero), aberration or the like hardly occurs. Further, light which is incident to a −X side with reference to the second surface S12 of the light guide member 10, in the external light, in other words, light which is incident to the light transmitting member 50 passes through the third light transmitting surface S53 and the first light transmitting surface S51 provided therein, but at this time, since the third light transmitting surface S53 and the first light transmitting surface S51 are formed in planes which are approximately parallel to each other, aberration or the like hardly occurs. Furthermore, when light which is incident to the light transmitting member 50 corresponding to the second surface S12 of the light guide member 10, in external world light, passes through the third transmitting surface S53 and the first surface S11, since the third transmitting surface S53 and the first surface S11 are formed in planes which are approximately parallel to each other, aberration or the like hardly occurs. With such a configuration, an observer observes an external world image without distortion through the light transmitting member 50.

The above-described configuration is similarly applied to the second display device 100B (see FIG. 1 or the like). Thus, it is possible to form images corresponding to the right and left eyes, respectively.

Figure 4:
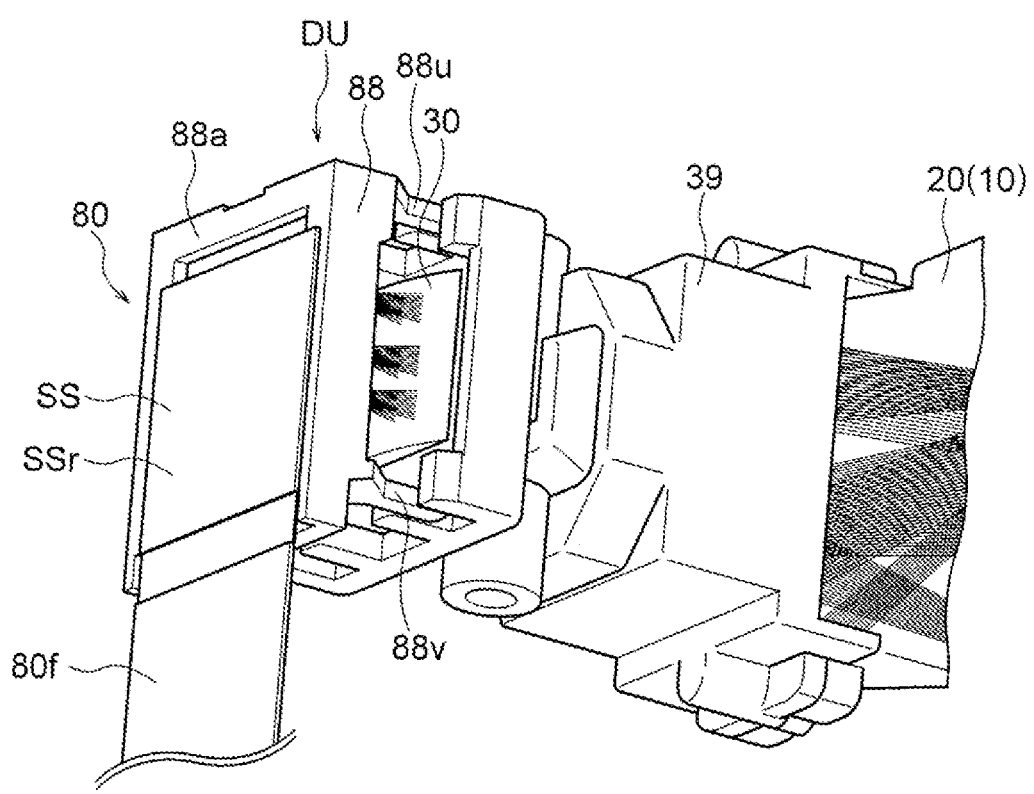
FIG. 4 is a perspective view illustrating a state where a display device unit is assembled in a projection lens.

Hereinafter, a display device unit DU which is a video device unit including the image display device (video device) 80 will be described with reference to FIG. 4, and the like. FIG. 4 is a perspective view illustrating a state where the display device unit DU is assembled in the projection lens 30 (lens barrel 39). In the first display device 100A and the second display device 100B, since the display device unit DU is symmetric and has the same structure, in FIGS. 4 and 5, only the display device unit DU on the left side is shown for description, and description of the display device unit DU on the right side will not be repeated.

Figure 5:
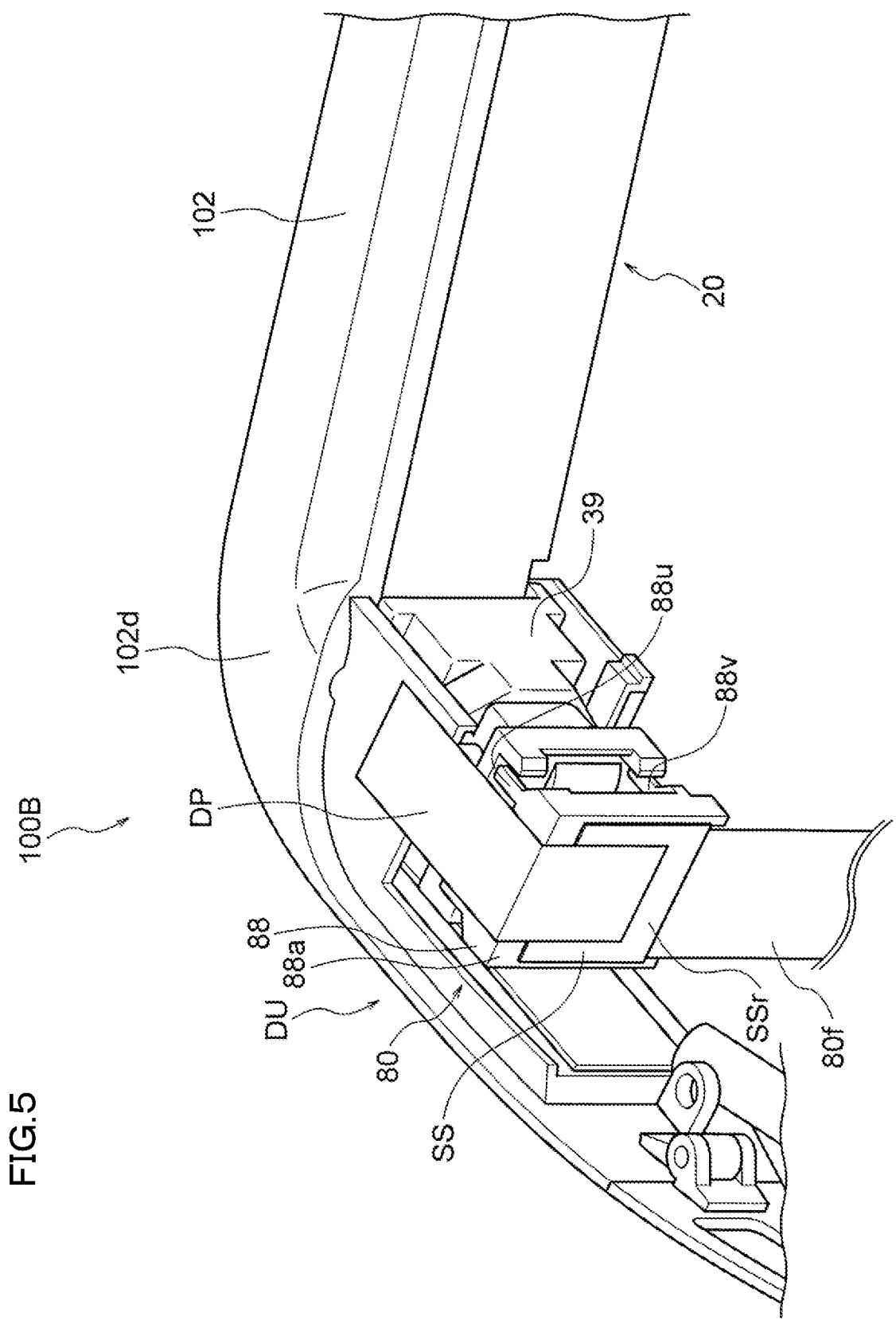
FIG. 5 is a perspective view illustrating a state of a structure of a display portion of a virtual image display apparatus.

As shown in FIG. 4, the display device unit DU has a configuration in which the image display device (video device) 80 is accommodated in a casing portion 88 to be unitized (modularized). In other words, the image display device 80 is accommodated in the box-shaped casing portion 88 through fitting, and is retained so as not to move. Particularly, in this embodiment, as shown in the figure, the casing portion 88 is provided with a heat dissipating structure portion 88a, and thus, supports and fixes the image display device 80 in a state where a side of the image display device 80 opposite to a side thereof where video light is emitted is opened and exposed. Furthermore, in this embodiment, as shown in FIG. 5, by providing a heat dissipating portion DP configured so that a thermal conductive tape is directly attached to a portion exposed from the casing portion 88 in a rear side portion of the image display device 80, for example, heat dissipation of the image display device 80 is promoted. In this example, the heat dissipating portion DP formed by the thermal conductive tape is attached to extend over a frame portion 102 which is a support frame from the image display device 80 to the lens barrel 39.

Here, in a case where the above-described self-luminous type image display device (video device) 80 is applied to an HMD to form a high luminance image, a structure in which a light emitting source is provided in a panel substrate and a driver IC for driving, a power source element, and the like is provided therein is used. Thus, increase in internal temperature may cause a problem. Particularly, in a case where an organic EL (OLED) panel is applied to a panel portion of the image display device (video device) 80 as in this embodiment, there is a concern that performance deterioration or life shortening due to increase in internal temperature becomes noticeable as its characteristic.

In this embodiment, in order to solve the above-mentioned problem, in a structure of the display device unit (video device unit) DU, particularly, by exposing a part of a silicon substrate SS that forms the image display device 80 through the heat dissipating structure portion 88a of the casing portion 88, it is possible to efficiently perform heat dissipation using the heat dissipating portion DP (see FIG. 5) configured by a thermal conductive tape or the like, and to provide a structure in which accuracy of an assembly position of the casing portion 88 and the image display device 80 is enhanced using edge surfaces of the silicon substrate SS of the image display device 80.

Hereinafter, a structure of the display device unit (video device unit) DU or the casing portion 88 and the image display device 80 that form the display device unit DU will be described in detail with reference to FIGS. 6A and 6B, and the like.

Figure 8A:
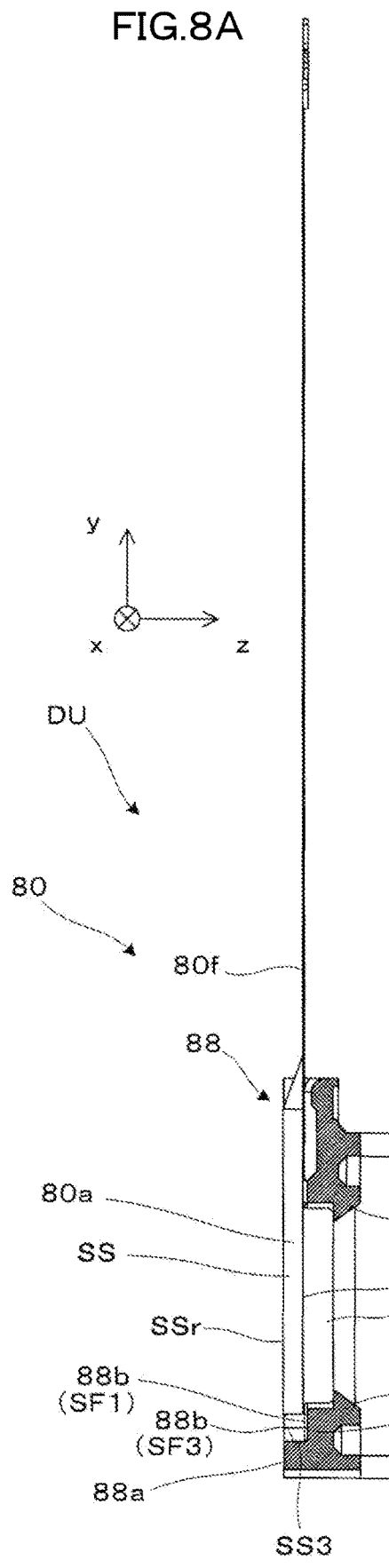
FIG. 8A is a sectional side view of a display device unit.

First, a structure of the image display device 80 among the image display device 80 and the casing portion 88 that form the display device unit DU will be described with reference to FIGS. 6A and 6B, FIGS. 7A to 7C, and FIGS. 8A and 8B. As shown in the figures, the image display device 80 includes a main body portion 80a of a rectangular plate shape accommodated in the casing portion 88, and a flexible printed circuit (FPC) portion 80f that is connected and extended from the main body portion 80a. Here, as shown in FIG. 8A, the main body portion 80a includes a silicon substrate SS on which various circuits are provided, which forms an appearance of the main body portion 80a, a light emitting portion 80k that is an organic EL element including an organic EL material and generates color light to become video light, and a protective glass GG for sealing that blocks the light emitting portion 80k in cooperation with the silicon substrate SS. The image display device 80 performs a light emitting operation according to a drive signal received from the FPC portion 80f, to thereby emit video light toward the protective glass GG, that is, in a +z direction. Furthermore, as shown in the figure, the image display device 80 is accommodated in the casing portion 88 in a state where a part of the main body portion 80a is exposed, as described above. More specifically, the image display device 80 is supported and fixed in a state where the entirety of a rear surface SSr of the silicon substrate SS disposed on a side opposite to a side where video light is emitted is exposed.

Here, in this embodiment, with respect to a configuration of the image display device 80, a silicon (Si) substrate is employed as a self-luminous type element substrate on which an organic EL (OLED) is mounted. Thus, first, it is possible to provide high thermal conductivity with respect to the above-described heat dissipation, and to perform highly efficient heat dissipation. Further, in manufacturing of a circuit board for forming a light emitting element, it is possible to form a circuit having a precise configuration, that is, a fine structure (for example, in the unit of several microns). Furthermore, as the silicon substrate is configured to form the appearance of the image display device 80, each edge surface of the silicon substrate is cut with high accuracy using the height of accuracy (for example, within several tens of microns in manufacturing error) in silicon dicing to be used for positioning when the image display device 80 is accommodated in the casing portion 88, and thus, it is possible to set the positioning accuracy with respect to the casing portion 88 to become higher accuracy (for example, compared with that of a surface or the like of the protective glass GG). In addition, as described later, the casing portion 88 also serves as a member for aligning the display device unit (video device unit) DU in which the image display device 80 is provided and another optical member (in this embodiment, the lens barrel that accommodates the projection lens 30), but by maintaining the height of accuracy inside the unit, as a result, it is possible to maintain the positioning accuracy of the image display device 80 with respect to the projection lens 30 in a high accuracy state. That is, in this case, using the accuracy of dicing in formation of the edge surfaces of the silicon substrate, it is possible to achieve positioning with high accuracy, to reduce an adjustment range in assembly of the image display device 80 with respect to another member, and to achieve miniaturization in the entire device.

Next, a structure of the casing portion 88 among the image display device 80 and the casing portion 88 that form the display device unit DU will be described. As shown in the figure (for example, FIG. 8B), the casing portion 88 has a frame body structure having a through hole in a central portion, and includes a heat dissipating structure portion 88a that is formed with an opening OP through which a part of the image display device 80 is exposed, a display device positioning portion (video device positioning portion) 88b that performs positioning and fixing of the image display device 80, a mask portion 88m that is provided on a side where video light is emitted, which is opposite to the heat dissipating structure portion 88a or the display device positioning portion 88b, and removes unnecessary light from component light emitted from the image display device 80, and protrusion members (fitting portions) 88u and 88v which are attachment portions for performing attachment alignment with respect to the lens barrel 39 (see FIG. 4, or the like). That is, the casing portion 88 has a mask function for blocking unnecessary light and an alignment function in mounting with respect to other optical parts. The casing portion 88 is made of a metallic member with high thermal conductivity, such as aluminum or magnesium, for example, has a single member configuration formed by die-casting or the like, for example, that is, is a structure configured by a single member. In this case, by forming the casing portion 88 to have the single member configuration in which the opening OP is provided so that heat dissipation of the image display device 80 is secured, it is possible to achieve simple miniaturization of the image display device 80 and peripheral configurations thereof while maintaining necessary functions.

Figure 8B:
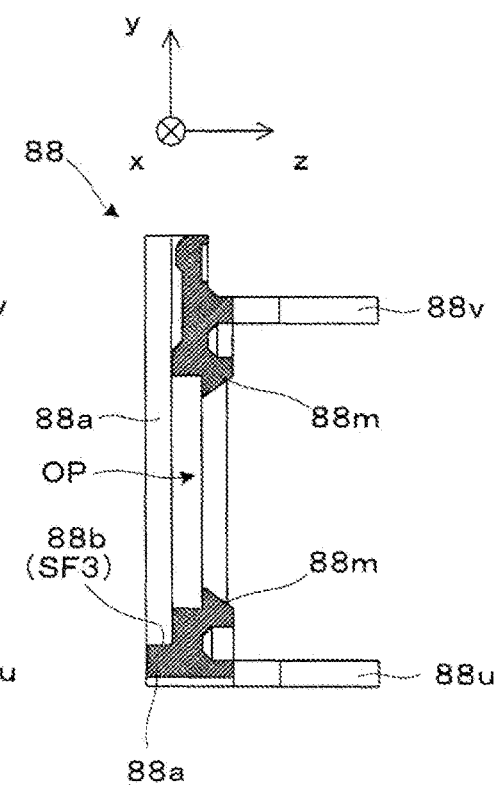
FIG. 8B is a sectional side view of a casing portion.

For example, as shown in FIG. 7C or FIG. 8B, in the casing portions 88, the heat dissipating structure portion 88a is formed as a groove portion of a U shape which is opened on a rear surface side thereof (a side opposite to a side where video light is emitted), that is, in a +y direction on a −z side in the figure, and the main body portion 80a of the image display device 80 is inserted from the +y side. Further, as described above, the casing portion 88 has a frame body structure having a through hole in a central portion, and the heat dissipating structure portion 88*a* is formed with the opening OP together with the U-shaped groove portion. In other words, as shown in the respective drawings other than FIG. 8B, the entirety of the rear surface SSr of the silicon substrate SS is exposed by the opening OP. From the standpoint of the casing portion 88, the casing portion 88 has the heat dissipating structure portion 88*a* that causes the rear surface SSr to be exposed through the opening OP for heat dissipation, and thus, the rear surface SSr of the silicon substrate SS serves as an exposure portion through the heat dissipating structure portion 88*a*.

Further, in the casing portion 88, the display device positioning portion (video device positioning portion) 88*b* that performs positioning by contact with the image display device 80 is configured by a first reference surface SF1 which is a reference plane portion for positioning in the z direction, a second reference surface SF2 which is a reference plane portion for positioning in the x direction, and a third reference surface SF3 which is a reference plane portion for positioning in the y direction, as shown in the figure. All the reference surfaces SF1 to SF3 come into contact with the respective edge surfaces SS1 to SS3 other than the rear surface SSr among the edge surfaces of the silicon substrate SS of a rectangular plate shape, for example, as shown in FIGS. 9A and 9B, to thereby perform positioning with high accuracy.

As described above, the casing portion 88 is a member that forms the display device unit DU that supports and fixes the image display device 80 while positioning by fitting and accumulates the image display device 80 to be unitized (modularized) and forms an alignment portion for performing assembly of the image display device 80, that is, the display device unit DU with respect to the lens barrel 39.

Further, in the casing portion 88, a pair of protrusion members 88*u* and 88*v* that extends in parallel with the optical axis AX is formed on the +z side (side where video light is emitted). As shown in FIG. 4 or FIG. 5, for example, the protrusion members (fitting portions) 88*u* and 88*v* are fitting portions that are smoothly fitted to a rear end portion of the lens barrel 39 of the projection lens (projection optical system) 30 so that the rear end portion is pinched therebetween, and are used to fix the casing portion 88 to the lens barrel 39. In other words, in FIG. 4, or the like, an adhesive fills a space between the inner surfaces of the protrusion members (fitting portions) 88*u* and 88*v* and a side surface of the lens barrel 39. The adhesive is cured after alignment of the casing portion 88 with respect to the lens barrel 39, so that the casing portion 88 is fixed to the lens barrel 39. Here, it is possible to perform alignment relating to rotating shafts in three directions in addition to three directions of an up-down direction, a right-left direction, and a front-rear direction. At a previous stage of the alignment, in the light guide member 10 of the light guide device 20, a base side thereof is be fitted to the lens barrel 39 to be fixed thereto. In this state, the casing portion 88 that accommodates the image display device 80 as described above aligns with the lens barrel 39 assembled with the light guide member 10 and the like, so that positioning of a final image can be performed. Particularly, in the case of a right-left pair configuration as in this embodiment, it is necessary to perform adjustment in the unit of pixels so that an image for the right eye side and an image for the left side eye are viewed in a state of being overlapped, and the positioning becomes very important. On the other hand, in this embodiment, since the image display device 80 is fitted to the casing portion 88 with high accuracy, it is possible to minimize a margin for the adjustment, and to avoid increase in size of the device as much as possible while enabling positional adjustment.

Hereinafter, an example of a manufacturing process of the display device unit DU, which is also a process of a manufacturing process of the virtual image display apparatus 100, will be described with reference to FIGS. 10A to 10E.

First, as shown in FIG. 10A, in the casing portion 88 which is a frame body structure, an adhesive 88*s* is applied on a surface including the first reference surface SF1 that is a reference for positioning in the z direction or a margin surface NS which is a surface adjacent to the first reference surface SF1 (adhesive applying process). Here, for example, a place where a drive circuit or the like is disposed may be used as a part of the margin surface NS for adhesion. In the first reference surface SF1, a configuration in which an end surface of the image display device 80 (silicon substrate SS) directly comes into contact with the first reference surface SF1 without through the adhesive 88*s* may be used. Further, for example, it may be considered that a high thermal conductive silicon-based adhesive or a thermal conductive epoxy adhesive is used as the adhesive 88*s*. By using such a high thermal conductive adhesive, it is possible to enhance heat dissipation even on a side where video light is emitted.

Next, as shown in FIG. 10B, by dropping the image display device 80 onto the surface of the first reference surface SF1, positioning is performed on the first reference surface SF1 while pushing the adhesive 88*s*. That is, an edge surface SS1 of the image display device 80 (silicon substrate SS) is brought into contact with the first reference surface SF1 to perform positioning (corresponding to FIG. 9A) in the z direction (first positioning process). Here, in the x direction, there is almost no margin (for example, a margin within several tens of microns, which is a level of errors in dicing of silicon), and thus, positioning relating to the second reference surface SF2. That is, an edge surface SS2 of the image display device 80 (silicon substrate SS) comes into contact with the second reference surface SF2 to perform positioning in the x direction (second positioning process).

Then, as shown in FIG. 10C, by pushing the image display device 80 in the −y direction (arrow Y1 direction) using a rod-shaped jig JG, an edge surface SS3 of the image display device 80 (silicon substrate SS) comes into contact with (strikes) the third reference surface SF3, and thus, positioning in the y direction (corresponding to FIG. 9B) is performed (third positioning process). Through the above-described first to third positioning processes, the first to third reference surfaces SF1 to SF3 are fixed by the adhesive 88*s* in a state where the rear surface SSr of the image display device 80 is exposed, to thereby function as the display device positioning device (video device positioning portion) 88*b* that determines an accommodation position of the image display device 80 in the casing portion 88. In the adjustment due to the jig JG shown in FIGS. 10B to 10C, that is, in slide movement, it is possible to prevent the adhesive 88*s* from being attached to a rectangular display area EA indicated by a broken line in the figure (that is, an area where an organic EL element or the like is to be formed and video light is to be emitted).

After the first to third positioning processes, as shown in FIG. 10D, the positional relationship between the image display device 80 and the casing portion 88 is fixed so as not to move by a hook jig FG capable of being inserted in the x direction, and then, the adhesive 88*s* is cured. Finally, after the adhesive 88*s* is cured, by separating the hook jig FG, as shown in FIG. 10E, the display device unit DU in which the image display device 80 is accommodated in the casing portion 88 to be unitized is manufactured. The cured adhesive 88s becomes an adhesive portion BP that fixes the image display device 80 and the casing portion 88.

As described above, since the virtual image display apparatus 100 including the display device unit DU according to this embodiment is a self-luminous type device that includes the light emitting portion 80k for generating video light in the image display device 80 which is a video device and does not need a separate light source, it is possible to achieve weight reduction and miniaturization, and to achieve weight reduction and miniaturization of the entirety of the virtual image display apparatus 100. Further, since the casing portion 88 of the display device unit DU has the heat dissipating structure portion 88a through which a part of the image display device 80 is exposed for heat dissipation, it is possible to reduce increase in internal temperature of the image display device 80. Further, although the image display device 80 is a self-luminous type, and particularly, includes an organic EL (OLED), it is possible to avoid performance degradation or life shortening due to increase in internal temperature, and to achieve excellent image formation. Furthermore, in manufacturing the display device unit DU, it is possible to perform simple and reliable assembly while securing a high heat dissipation characteristic. Here, particularly, it is possible to perform positioning with high accuracy using the characteristics of the silicon substrate SS.

Figure 11A:
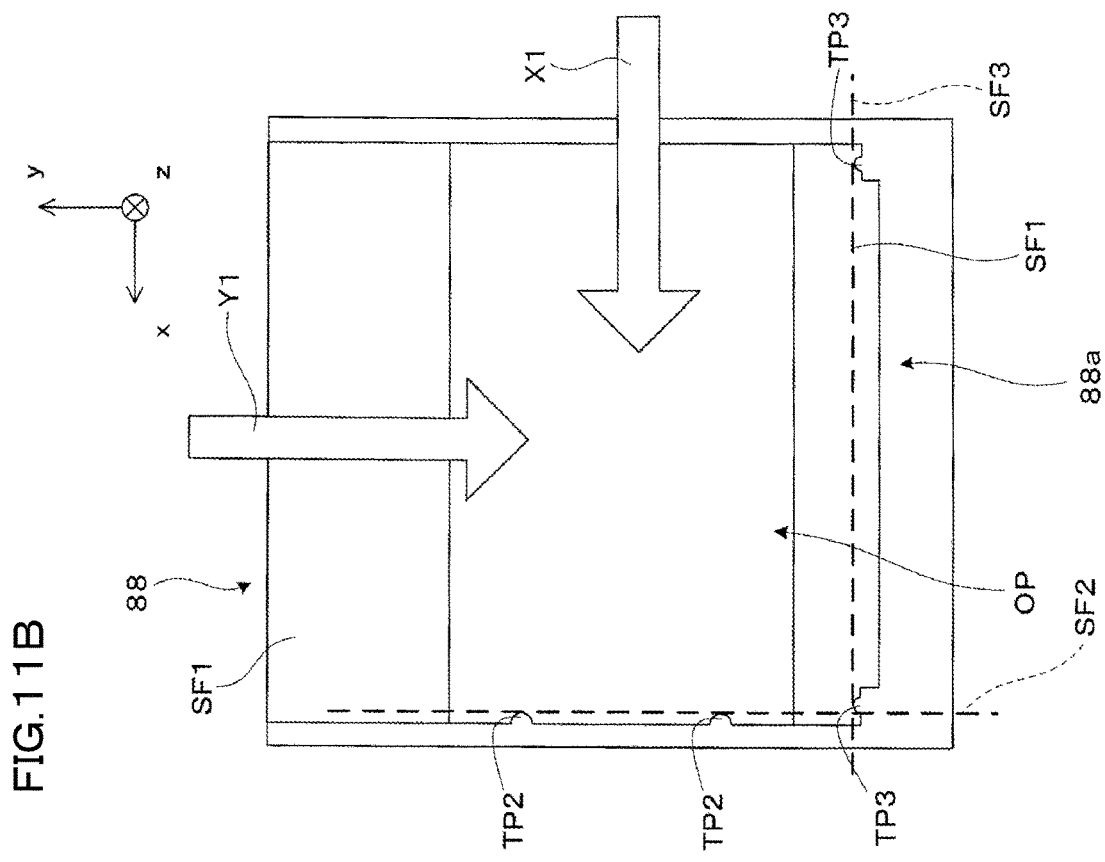
FIG. 11A is a conceptual diagram illustrating a modification example of a positioning structure inside a display device unit.

Hereinafter, a virtual image display apparatus according to a modification example of this embodiment will be described with reference to FIG. 11A. In the above-described embodiments, the first to third reference surfaces SF1 to SF3 that form the display device positioning portion (video device positioning portion) 88b are all formed in a plane shape, but for example, a part thereof may be formed in a protrusion shape. For example, in an example shown in FIG. 11A, instead of a reference plane for positioning in the y direction, third reference protrusion portions TP3 and TP3 are provided at the corresponding places. In the shown example, the third reference protrusion portions TP3 and TP3 are provided at two places of both ends of a surface corresponding to the plane, to thereby set the third reference surface SF3. In this case, an error in positioning in the y direction due to pushing in the arrow Y1 direction using a jig or the like can become zero or can be close to zero by the third reference protrusion portions TP3 and TP3.

Figure 11B:
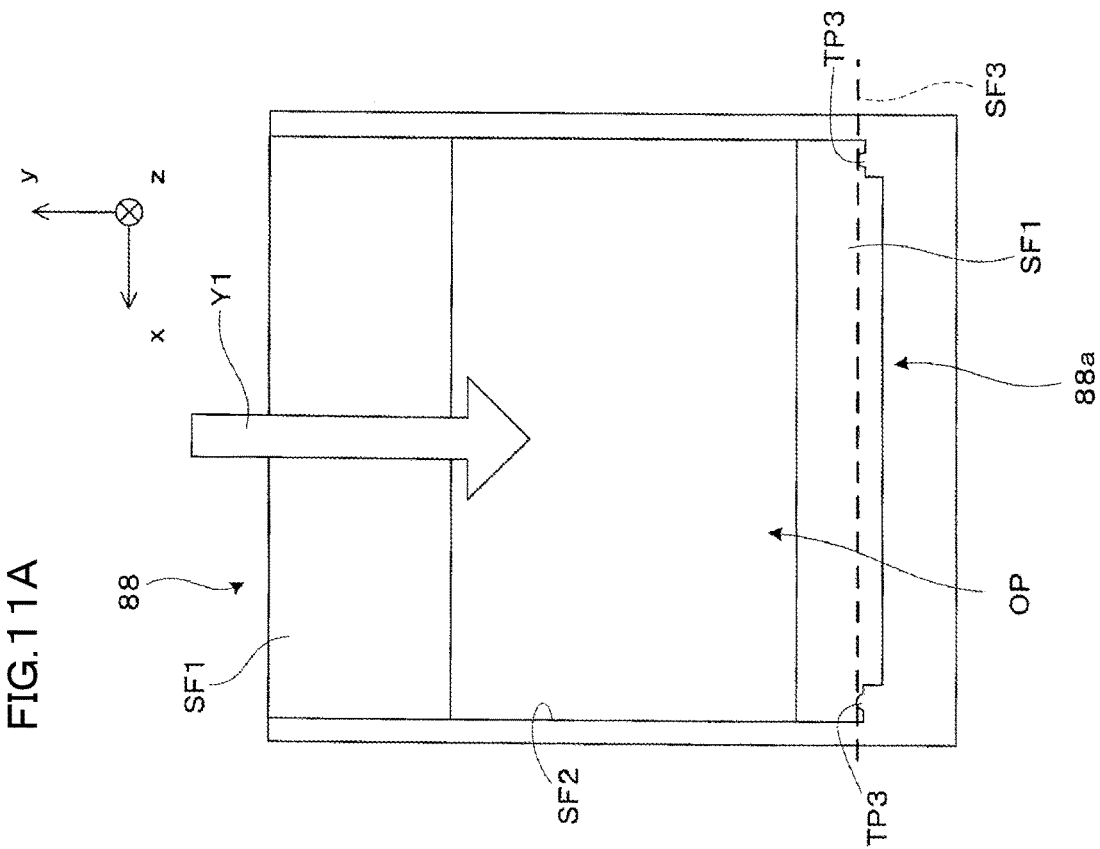
FIG. 11B is a conceptual diagram illustrating another modification example of the positioning structure inside the display device unit.

Further, for example, as shown in FIG. 11B, positioning in the x direction may be performed using a protrusion shape. That is, instead of a plane which is a positioning reference in the x direction, second reference protrusion portions TP2 and TP2 are provided at corresponding places. In the shown example, the second reference protrusion portions TP2 and TP2 are provided at two places of both ends of a surface (one-side surface) corresponding to the plane to set the second reference surface SF2. In this case, an error in positioning in the x direction and the y direction due to pushing in the arrow X1 direction and the arrow Y1 direction or in a direction including components in the two directions using a jig or the like can become zero or can be close to zero by the second reference protrusion portions TP2 and TP2, and the third reference protrusion portions TP3 and TP3.

Hereinbefore, the invention has been described with reference to the first embodiment, but the present embodiment is not limited to the above description, and may includes various modifications in a range without departing from the concept of the invention.

Figure 12B:
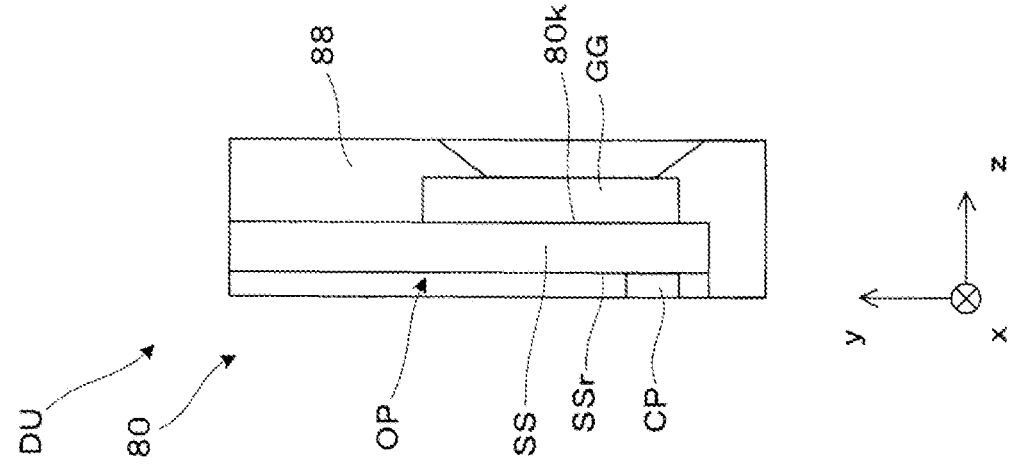
FIG. 12B is a cross-sectional view taken along an arrow line in FIG. 12A.
Figure 12A:
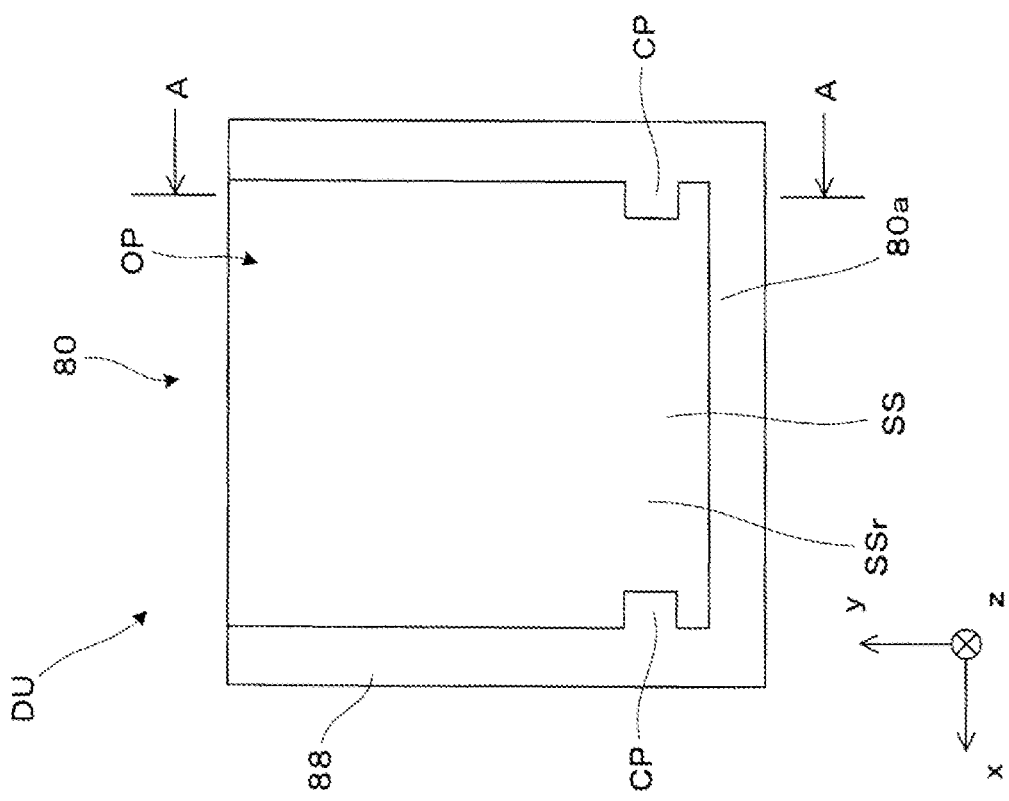
FIG. 12A is a conceptual diagram illustrating still another modification example of the display device unit.

For example, in the above example, a structure in which the entirety of the rear surface SSr of the silicon substrate SS is in a state of being exposed by the opening OP is shown, but with respect to exposure of the rear surface SSr, it is not essential that the entirety of the rear surface is exposed as long as heat dissipation or the like is sufficient, and a structure in which a part of the rear surface is covered by another member may be used. For example, as conceptually illustrated in FIG. 12A and FIG. 12B corresponding to an AA arrow cross section of FIG. 12A, a structure in which a pair of contact portions CP that comes into contact with a part of the rear surface SSr of the silicon substrate SS is provided in the casing portion 88 to support and fix the silicon substrate SS by the contact portion CP may be used.

Second Embodiment

Figure 14B:
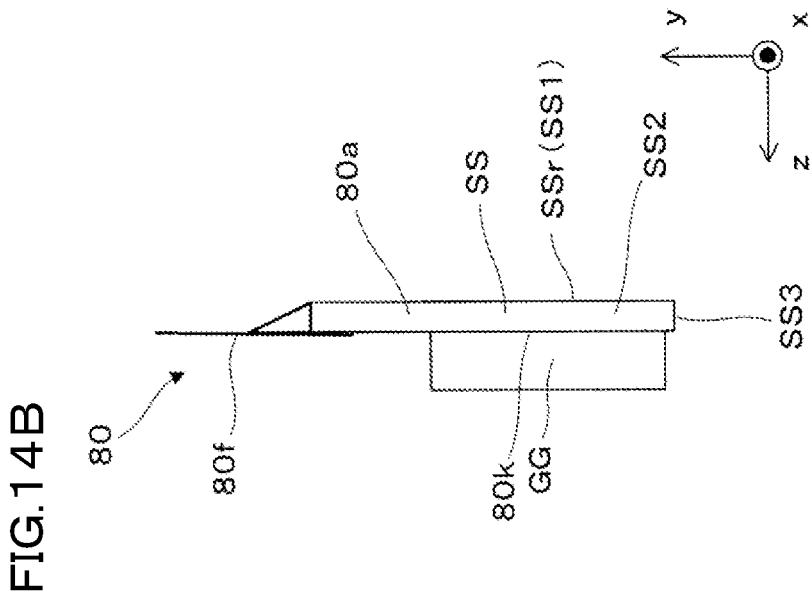
FIG. 14B is a side view thereof.
Figure 14A:
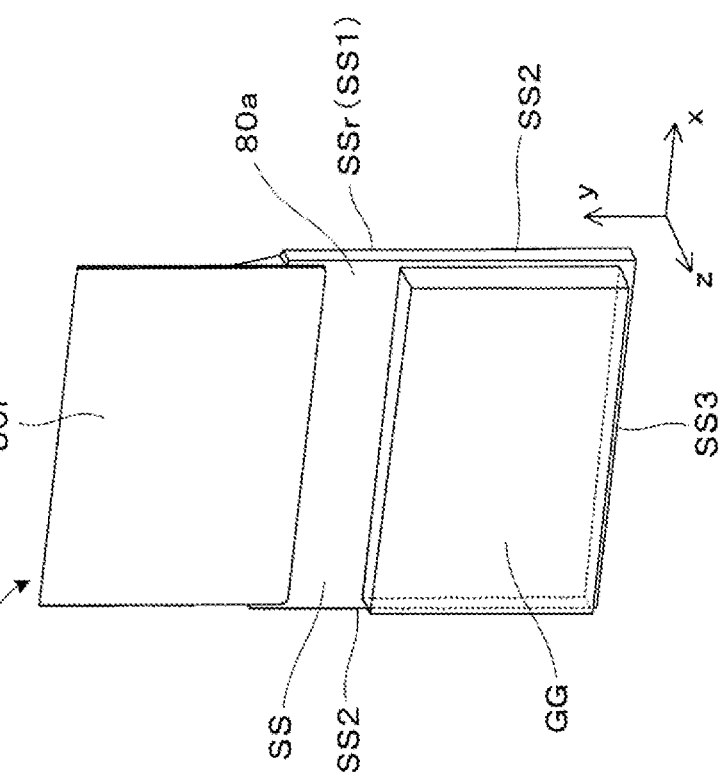
FIG. 14A is a perspective view of an image display device assembled in a display device unit.

Hereinafter, a virtual image display apparatus according to a second embodiment will be described with reference to FIGS. 13A to 13C, and the like. The virtual image display apparatus according to the second embodiment is formed by modifying a part of the virtual image display apparatus in the first embodiment, in which the other configurations except for the structure of the display device unit DU are the same as in the first embodiment. Thus, particularly, with respect to an entire configuration thereof, for example, FIGS. 1 to 3 in the first embodiment are applied. The second embodiment is different from the first embodiment in that a rear surface SSr of a silicon substrate SS is covered. Accordingly, description of the entire configuration or the like will not be repeated, and hereinafter, an image display device (video device) 80 or a display device unit DU that is a video device unit including the image display device 80 will be described with reference to FIGS. 13A to 13C, and the like. FIG. 13A is a perspective view of the display device unit DU (a perspective view including a front side), FIG. 13B is another perspective view thereof (a perspective view including a rear surface side), and FIG. 13C is a sectional side view thereof. FIG. 14A is a perspective view of the image display device (video device) 80 assembled in the display device unit DU, and FIG. 14B is a side view of the image display device 80. In a first display device 100A and a second display device 100B, the display device unit DU is symmetric and has the same structure.

As shown in FIGS. 13A to 13C, the display device unit DU has a configuration in which the image display device (video device) 80 is accommodated in a casing portion (casing member) 88 to be unitized (modularized). In other words, the image display device 80 is accommodated in the box-shaped casing portion 88 through fitting, and is retained so as not to move. Particularly, in this embodiment, as shown in the figures, the casing portion 88 has a plate-shaped portion 88p or the like provided being in contact with aside (rear surface side) opposite to a side where video light is emitted in the image display device 80 as a thermal conductive member 88h, to thereby promote heat dissipation while supporting and fixing the image display device 80. By further providing a heat dissipating portion (see the heat dissipating portion DP in FIG. 5 described in the first embodiment or FIGS. 21A and 21B or the like (to be described later)) configured by directly attaching a thermal conductive tape made of a graphite sheet or the like, for example, in a portion of a rear surface of the thermal conductive member 88h (plate-shaped portion 88p), heat dissipation of the image display device 80 may be promoted.

Here, in a case where the above-described so-called self-luminous type image display device (video device) 80 is applied to an HMD to form a high luminance image, a structure in which a light emitting source is provided in a panel substrate and a driver IC for driving, a power source element, and the like is provided therein may be used. Thus, increase in internal temperature may easily cause a problem. Particularly, in a case where an organic EL (OLED) panel is applied to a panel portion of the image display device (video device) 80 as in this embodiment, there is a concern that performance deterioration or life shortening due to increase in internal temperature becomes noticeable as its characteristic.

In this embodiment, in order to solve the problems, in a structure of the display device unit (video device unit) DU, particularly, the thermal conductive member 88*h* of the casing portion 88 is configured to be in contact with the image display device 80 in the form of area contact, so that efficient heat dissipation can be achieved. Furthermore, a structure in which enhancement of accuracy of an assembly position of the casing portion 88 and the image display device 80 is achieved using edge surfaces of the silicon substrate SS of the image display device 80 is provided.

Hereinafter, details of a structure of the display device unit (video device unit) DU or the casing portion 88 and the image display device 80 that form the display device unit (video device unit) DU will be described with reference to FIGS. 13A to 13C, and the like.

First, a structure of the image display device 80 among the image display device 80 and the casing portion 88 that form the display device unit DU will be described with reference to FIGS. 13A to 13C, and FIGS. 14A and 14B. As shown in the figures, the image display device 80 includes a main body portion 80*a* of a rectangular plate shape accommodated in the casing portion 88, and a flexible printed circuit (FPC) portion 80*f* that is connected and extended from the main body portion 80*a*. Here, as shown in each figure (particularly, as shown in the sectional side view of FIG. 13C), the main body portion 80*a* includes a silicon substrate SS on which various circuits are provided, which forms an appearance of the main body portion 80*a*, a light emitting portion 80*k* that is an organic EL element including an organic EL material and generates color light to become video light, and a protective glass GG for sealing that blocks the light emitting portion 80*k* in cooperation with the silicon substrate SS. The image display device 80 performs a light emitting operation according to a drive signal received from the FPC portion 80*f*, to thereby emit the video light toward the protective glass GG, that is, in the +z direction.

Here, in this embodiment, particularly, in the image display device 80, the entirety of a rear surface SSr (first edge surface SS1) or side surfaces (second and third edge surfaces SS2 and SS3) of the silicon substrate SS disposed on a side opposite to a side where video light is emitted is fixed to contact surfaces of the casing portion 88 in a state of being adhered over the entirety of the surfaces by a high thermal conductive adhesion portion BD formed by a high thermal conductive adhesive such as a high thermal conductive silicon-based adhesive or a high thermal conductive epoxy adhesive, for example. In other words, the rear surface SSr, or the like becomes a portion (fixed portion) to be fixed through contact.

Further, in this embodiment, as described above, with respect to a configuration of the image display device 80, a silicon (Si) substrate is employed as a self-luminous type device substrate on which an organic EL (OLED) is mounted. Thus, first, it is possible to provide high thermal conductivity with respect to the above-described heat dissipation, and to perform highly efficient heat dissipation.

Further, in manufacturing of a circuit board for forming a light emitting element, it is possible to form a circuit having a precise configuration, that is, a fine structure (for example, in the unit of several microns). Furthermore, as the silicon substrate is configured to form the appearance of the image display device 80, each edge surface of the silicon substrate is cut with high accuracy using the height of accuracy (for example, within several tens of microns in manufacturing error) in silicon dicing to be used for positioning when the image display device 80 is accommodated in the casing portion 88, and thus, it is possible to set the positioning accuracy with respect to the casing portion 88 with higher accuracy (for example, compared with that of a surface of the protective glass GG, or the like). In addition, the casing portion 88 also serves as a member for aligning the display device unit (video device unit) DU in which the image display device 80 is provided and another optical member (in this embodiment, the lens barrel 39 that accommodates the projection lens 30, or an optical display unit LU), but by maintaining the height of accuracy inside the unit, as a result, it is possible to maintain the positioning accuracy of the image display device 80 with respect to the projection lens 30 in a high accuracy state.

Next, a structure of the casing portion 88 among the image display device 80 and the casing portion 88 that form the display device unit DU will be described. As shown in the FIGS. 13A to 13C, the casing portion 88 is a metallic member having high thermal conductivity formed of aluminum, titanium, copper, stainless steel, a grapheme member, a heat pipe, or the like, or formed of magnesium, or the like, for example, and is a structure having a single member configuration formed by die-casting or the like, for example, that is, a structure formed by a single member. Particularly, in a case where the casing portion 88 is formed of aluminum, titanium, copper, stainless steel, a grapheme member, a heat pipe, or the like, the casing portion 88 has high thermal conductivity. In addition, by causing at least a portion to become the thermal conductive member 88*h* to be formed of metal, a filler-containing resin, a grapheme member, a heat pipe, or the like, the casing portion 88 may have high terminal conductivity. Here, as described above, the casing portion 88 of the integrated shape includes a plate-shaped portion 88*p* which is a flat plate-shaped portion, a frame-shaped portion 88*f* which is a frame structure-shaped portion, and protrusion members (fitting portions) 88*u* and 88*v* which are protrusion-shaped portions.

The plate-shaped portion 88*p* forms a rectangular flat plate-shaped portion that forms a surface-shaped portion on a rear side in the casing portion 88, and is adhered to the rear surface of the image display device 80 to support and fix the image display device 80. That is, the plate-shaped portion 88*p* also functions as a video device positioning portion that causes the rear surface SSr (referred to as a first edge surface SS1) of the silicon substrate SS of the image display device 80 to come into contact with the plate-shaped portion 88*p* to determine an accommodation position of the image display device 80.

The frame-shaped portion 88*f* forms an edge portion of a U-shape in which a side (in the +y direction) where the image display device 80 is inserted in assembly is opened, on a peripheral side of the plate-shaped portion 88*p* in the casing portion 88, and supports and fixes the image display device 80 by being adhered to the side surfaces of the image display device 80, that is, the side surfaces (second and third edge surfaces SS2 and SS3) of the silicon substrate SS. That is, the frame-shaped portion 88*f* also functions as a video device positioning portion that determines an accommodation position of the image display device 80 by bringing the silicon substrate SS of the image display device 80 into contact with the frame-shaped portion 88*f*.

The protrusion members (fitting portions) 88*u* and 88*v* are attachment portions for attachment alignment with respect to the lens barrel 39 (see FIG. 3, or the like).

It may be considered that the casing portion 88 has a thermal conductive member 88*h* that conducts heat generated in the image display device 80 by being in contact with a part of the image display device 80, and a display device positioning portion (video device positioning portion) 88*t* that performs positioning and fixing of the image display device 80. As described above, in a case where the casing portion 88 is formed of a single metallic member, thermal conductivity becomes high in the entirety of the plate-shaped portion 88*p*, the frame-shaped portion 88*f* and the protrusion members (fitting portions) 88*u* and 88*v*, and these portions may function as the thermal conductive member 88*h*. Particularly, in the example shown in the figure, since the surface portions of the plate-shaped portion 88*p* and the frame-shaped portion 88*f* are in direct contact with the image display device 80 to conduct heat of the light emitting portion, it can be said that the plate-shaped portion 88*p* and the frame-shaped portion 88*f* function as main portions of the thermal conductive member 88*h*. Here, it is considered that the plate-shaped portion 88*p* has a relatively large contact place with the image display device 80 and greatly contributes to conduction (heat dissipation) of heat generated in the image display device 80. The protrusion members 88*u* and 88*v* may function as the thermal conductive member 88*h* by further conducting heat from the plate-shaped portion 88*p* and the frame-shaped portion 88*f*.

Further, in the casing portion 88, a part of the surface portions of the plate-shaped portion 88*p* and the frame-shaped portion 88*f* also functions as the display device positioning portion (video device positioning portion) 88*t* that performs positioning by being in contact with the image display device 80. Specifically, as shown in FIGS. 13A and 13C, in the surface portions of the plate-shaped portion 88*p* and the frame-shaped portion 88*f*, a first reference surface SF1 (plane perpendicular in the z direction) which is a reference plane portion for positioning in the z direction, a second reference surface SF2 (plane perpendicular in the x direction) which is a reference plane portion for positioning in the x direction, and a third reference surface SF3 (plane perpendicular in the y direction) which is a reference plane portion for positioning in the y direction forms the display device positioning portion 88*t*. The reference surfaces SF1 to SF3 come into contact with the first edge surface SS1 which is the rear surface SSr among the edge surfaces of the silicon substrate SS of a rectangular plate shape, and the second and third edge surfaces SS2 and SS3 which are side surfaces formed on lateral sides of the edge surface SS1, to thereby perform positioning with high accuracy.

As described above, the casing portion 88 is a member that forms the display device unit DU by supporting and fixing the image display device 80 while positioning the image display device 80 through fitting and adhesion and accommodating the image display device 80 to be unitized (modularized) and forms an alignment portion for performing assembly of the image display device 80, that is, the display device unit DU with respect to the lens barrel 39. Specifically, the casing portion 88 includes a pair of protrusion members (fitting portions) 88*u* and 88*u*, and a pair of protrusion members (fitting portions) 88*v* and 88*v* as the alignment portion.

As shown in FIGS. 13A to 13C, with respect to the protrusion members 88*u*, 88*u*, 88*v*, and 88*v*, the pair of protrusion members 88*v* and 88*v* which is provided on a side (in the +y direction) where the image display device 80 is inserted in assembly of the image display device 80 and the casing portion 88 has a longitudinally long (long in the y direction and short in the x direction) cross-sectional shape, compared with the other pair of protrusion members 88*u* and 88*u* which is provided on a striking side with respect to the image display device 80. Thus, it is possible to assemble the image display device 80 while making the casing portion 88 small as much as possible.

Furthermore, the protrusion members 88*u* and 88*v* which are fitting portions for fitting with another optical member (lens barrel 39) are smoothly fitted to a rear end portion of the lens barrel 39 of the projection lens (projection optical system) 30 so that the rear end portion is pinched therebetween, to thereby fix the casing portion 88 to the lens barrel 39. In this case, an adhesive fills a space between the inner surfaces of the protrusion members (fitting portions) 88*u* and 88*v* and side surfaces of the lens barrel 39. The adhesive is cured after alignment of the casing portion 88 with respect to the lens barrel 39, so that the casing portion 88 is fixed to the lens barrel 39. Thus, it is possible to perform alignment relating to rotating shafts in three directions in addition to three directions of an up-down direction, a right-left direction, and a front-rear direction. At a previous stage of the alignment, in the light guide member 10 of the light guide device 20, a base side thereof is fitted to the lens barrel 39 to be fixed thereto. In this state, the casing portion 88 that accommodates the image display device 80 as described above aligns with the lens barrel 39 assembled with the light guide member 10 and the like, so that positioning of a final image can be performed. Particularly, in the case of a right-left pair configuration as in this embodiment, it is necessary to perform adjustment in the unit of pixels so that an image for the right eye side and an image for the left side eye are viewed in a state of being overlapped, and the positioning becomes very important. On the other hand, in this embodiment, since the image display device 80 is fitted to the casing portion 88 with high accuracy, it is possible to minimize a margin for the adjustment, and to avoid increase in size of the device as much as possible while enabling positional adjustment.

Here, in addition to the above description, it may be considered that a structure for dissipating heat generated inside the image display device 80 itself is provided. For example, in the image display device 80 having the above-described structure, the FPC portion 80*f* may be configured to include a thermal conductive material for conducting heat of the light emitting portion 80*k* so that heat dissipation can be performed through the FPC portion 80*f*. That is, the FPC portion 80*f* that extends from the main body portion 80*a* of the image display device 80 may also function as a thermal conductive portion.

Hereinafter, an example (FIGS. 15A and 15B) of a manufacturing process of the display device unit DU, which is also a process of a manufacturing process of the virtual image display apparatus 100, and an example (FIGS. 15C to 15E) of an assembly process of the display device unit DU and the lens barrel 39 will be described with reference to FIGS. 15A to 15E. In FIGS. 15A and 15B, for ease of description, the display device unit DU is shown in sectional side views, and in FIGS. 15C to 15E, the display device unit DU is shown in side views.

First, as shown in FIG. 15A, in the plate-shaped portion 88*p* and the frame-shaped portion 88*f* of the casing portion 88, an adhesive 88s to become a thermal conductive adhesion portion BD is applied on the first to third reference surfaces SF1 to SF3 which become positioning references in the respective z, y and x directions (adhesive applying process). As the adhesive 88s, as described above, for example, a high thermal conductive silicon-based adhesive or a thermal conductive epoxy adhesive may be used. By using the high thermal conductive adhesive, it is possible to enhance heat dissipation even on a side where video light is emitted.

Then, as indicated by an arrow A1 in FIG. 15B, the image display device 80 is inserted from the +y side opened in the frame-shaped portion 88f of a U-shape that forms the casing portion 88, and the respective edge surfaces SS1 to SS3 of the silicon substrate SS of the image display device 80 are brought into contact with the reference surfaces SF1 to SF3 on which the adhesive 88s is applied, to thereby perform positioning (positioning process). Then, the adhesive 88s is cured for adhesion and fixing (adhesion and fixing process). Through these processes, the display device unit DU is manufactured (display device unit manufacturing process).

Then, as shown in FIG. 15C, in addition to the manufactured display device unit DU, the lens barrel 39 which is a target to be assembled with the display device unit DU is prepared (preparation process). For example, the lens barrel 39 is fixed, and the casing portion 88 is attached to jigs (not shown) so as to perform position adjustment with respect to the lens barrel 39 in 6-axial directions. Further, an adhesive AH fills each groove portion 39w which is a connection portion with respect to the protrusion members (fitting portions) 88u and 88v of the casing portion 88, in the lens barrel 39. As shown in FIG. 15D, alignment (6-axial alignment) relating to rotational shafts in three directions in addition to three directions of an up-down direction, a right-left direction, and a front-rear direction while appropriately moving the casing portion 88 from this state to insert the respective protrusion members 88u and 88v corresponding to the groove portions 39w filled with the adhesive AH (alignment process). Finally, for example, in a state where waste at places for assembly or bonding with other parts, or in the vicinity thereof is removed as necessary, as shown in FIG. 15E, a gap between the casing portion 88 and the lens barrel 39 is sealed using a seal member SL of a tape shape (sealing process). Here, for example, the seal member SL may be configured to have high thermal conductivity (the seal member SL may be formed of a high thermal conductive material). Furthermore, in the case of the manufacturing described above, the protrusion members 88u and 88v which are connection portions with respect to another optical member (lens barrel 39) in the casing portion 88 may function as the thermal conductive member 88h, to thereby transfer heat toward the other optical member side through the protrusion members 88u and 88v (a specific example will be described with reference to FIGS. 17A to 17C, or the like).

As described above, since the virtual image display apparatus 100 that includes the display device unit DU according to this embodiment, the image display device 80 which is a video device is a self-luminous type device that includes the light emitting portion 80k that generates video light and does not need a separate light source, it is possible to achieve weight reduction and miniaturization of the entirety of the virtual image display apparatus 100. In addition, since the casing portion 88 of the display device unit DU includes the thermal conductive member 88h that conducts heat of the light emitting portion 80k being in contact with the image display device 80, it is possible to reduce increase in internal temperature of the image display device 80. Further, although the image display device 80 is a self-luminous type, and particularly, includes an organic EL (OLED) element, it is possible to avoid performance degradation or life shortening due to increase in internal temperature, and to achieve excellent image formation. Furthermore, in manufacturing of the display device unit DU, it is possible to perform easy and reliable assembly while securing a high heat dissipation characteristic. Here, particularly, using the characteristics of the silicon substrate SS, it is possible to perform positioning with high accuracy.

Third Embodiment

Figure 16:
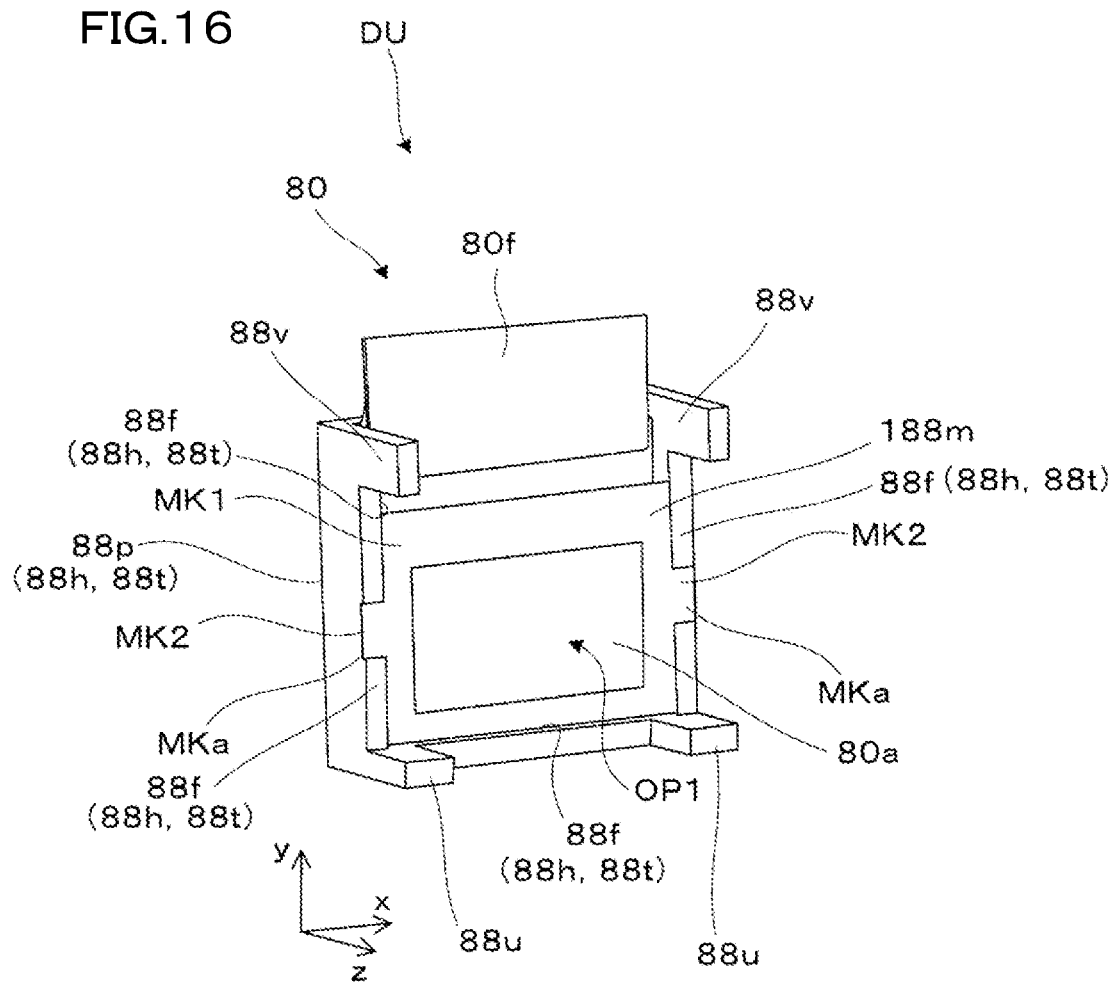
FIG. 16 is a perspective view illustrating an example of a display device unit assembled in a virtual image display apparatus according to a third embodiment.

Hereinafter, a virtual image display apparatus according to a third embodiment will be described with reference to FIG. 16. The virtual image display apparatus according to the third embodiment is formed by modifying a part of the virtual image display apparatus according to the second embodiment. FIG. 16 is a diagram corresponding to FIG. 13A and illustrating an example of a display device unit DU assembled in the virtual image display apparatus according to this embodiment. Further, since portions which are not particularly described are the same as in the second embodiment, the entirety of the virtual image display apparatus will not be shown and description thereof will not be repeated.

As shown in FIG. 16, the display device unit DU assembled in the virtual image display apparatus according to this embodiment further includes a mask portion 188m that is provided on a side where video light is emitted, which is opposite to a thermal conductive member 88h or a display device positioning portion 88t that forms the casing portion 88, and removes unnecessary light from component light emitted from the image display device 80. In other words, a configuration in which a light shielding mask is added to the casing portion 88 is provided. In the case of the casing portion 88 having the configuration illustrated in the second embodiment, a structure in which a rear surface side (back surface side) of the image display device 80 is covered with a plate-shaped portion 88p is provided. Thus, in the casing portion 88, it may be difficult to realize a single component including a mask structure on a display side in manufacturing. Accordingly, in this embodiment, a configuration in which a mask portion 188m which is a light shielding mask is further provided as a separate member is provided.

The mask portion 188m has a main body portion MK1 which has a frame body shape made of metal, for example, and protrusion portions MK2 which protrude from a part of the main body portion MK1 and perform alignment (positioning) with the casing portion 88. The mask portion 188m is positioned with respect to the casing portion 88 in the protrusion portions MK2, so that an opening OP1 formed in the main body portion MK1 is disposed at an appropriate position, to thereby remove (shield) unnecessary light while emitting video light through the opening OP1.

On the other hand, the casing portion 88 has light shielding positioning portions (mask positioning portions) MKa provided corresponding to the protrusion portions MK2 to accurately perform the positioning of the mask portion 188m. For example, grooves corresponding to the shapes and positions of the protrusion portions MK2 in surface portions of the frame-shaped portion 88f may be formed to function as the light shielding positioning portions MKa that determine the position of the mask portion 188m by bringing the mask portion 188m in contact with the casing portion 88. By using the protrusion portions MK2 and the light shielding positioning portions MKa, it is possible to perform attachment with high accuracy.

Further, instead of the mask portion 188*m* having the above-described configuration, a configuration in which a separate light shielding tape or light shielding sheet is fixed to the casing portion 88 for positioning may be considered. In this case, the light shielding sheet or the like may be fixed using an adhesive, or may be fixed using a double sided tape, for example.

Fourth Embodiment

Hereinafter, a virtual image display apparatus according to a fourth embodiment will be described with reference to FIGS. 17A to 17C. The virtual image display apparatus according to the fourth embodiment is formed by modifying a part of the virtual image display apparatus according to the second embodiment. A display device unit DU and a lens barrel 39 (or an optical display unit LU) to be assembled in the virtual image display apparatus according to this embodiment, of which an example is shown in FIG. 17A and the like, correspond to a modification example of the display device unit DU and the lens barrel 39 that form the virtual image display apparatus 100 in the second embodiment. Further, since portions which are not particularly described are the same as in the second embodiment, the entirety of the virtual image display apparatus will not be shown and description thereof will not be repeated.

As shown in FIGS. 17A to 17C, the display device unit DU assembled in the virtual image display apparatus according to this embodiment is in contact with the lens barrel 39 (or the optical display unit LU) in a larger number of places. Thus, it is possible to enable thermal conduction to the lens barrel 39, and to enhance a heat dissipation effect.

Particularly, in the shown example, with respect to protrusion members (fitting portions), in addition to a pair of protrusion members 88*u* and 88*u* and a pair of protrusion members 88*v* and 88*v*, a pair of protrusion members 88*x* and 88*x* is further provided between the pair of protrusion members 88*u* and 88*u* and the pair of protrusion members 88*v* and 88*v*, and a high thermal conductive adhesive such as a high thermal conductive silicon-based adhesive or a thermal conductive epoxy adhesive is applied as an adhesive AH in each position. Thus, it is possible to perform assembly with the lens barrel 39 in a state where thermal conduction is enhanced.

Various modification examples may be considered in addition to the above-described embodiments. For example, as in a display device unit DU of a modification example shown in FIGS. 18A and 18B, a configuration in which a fin structure FS is provided on a rear surface (back surface) of the plate-shaped portion 88*p* that functions as the thermal conductive member 88*h* in the casing portion 88 may be used. Here, as shown in the figures, plural fins FN are provided in the fin structure FS to form flow paths along an up-down direction (y direction) A2. If air is heated in the vicinity of the display device unit DU, the air is expanded to become light, and moves up. Then, new air flows in from a lower side. In this case, if the plural fins FN are provided to have the above-described shape, it is considered that convection current is easily generated and heat exchange efficiency is enhanced. Further, for example, the display device unit DU may be combined with another component while providing the flow paths along the up-down direction (y direction) as described above. Furthermore, in addition to the above-described structure in which the fins are provided, a configuration in which a separate heat dissipating structure is provided, in other words, the heat dissipating structure is combined may be used.

Figure 19:
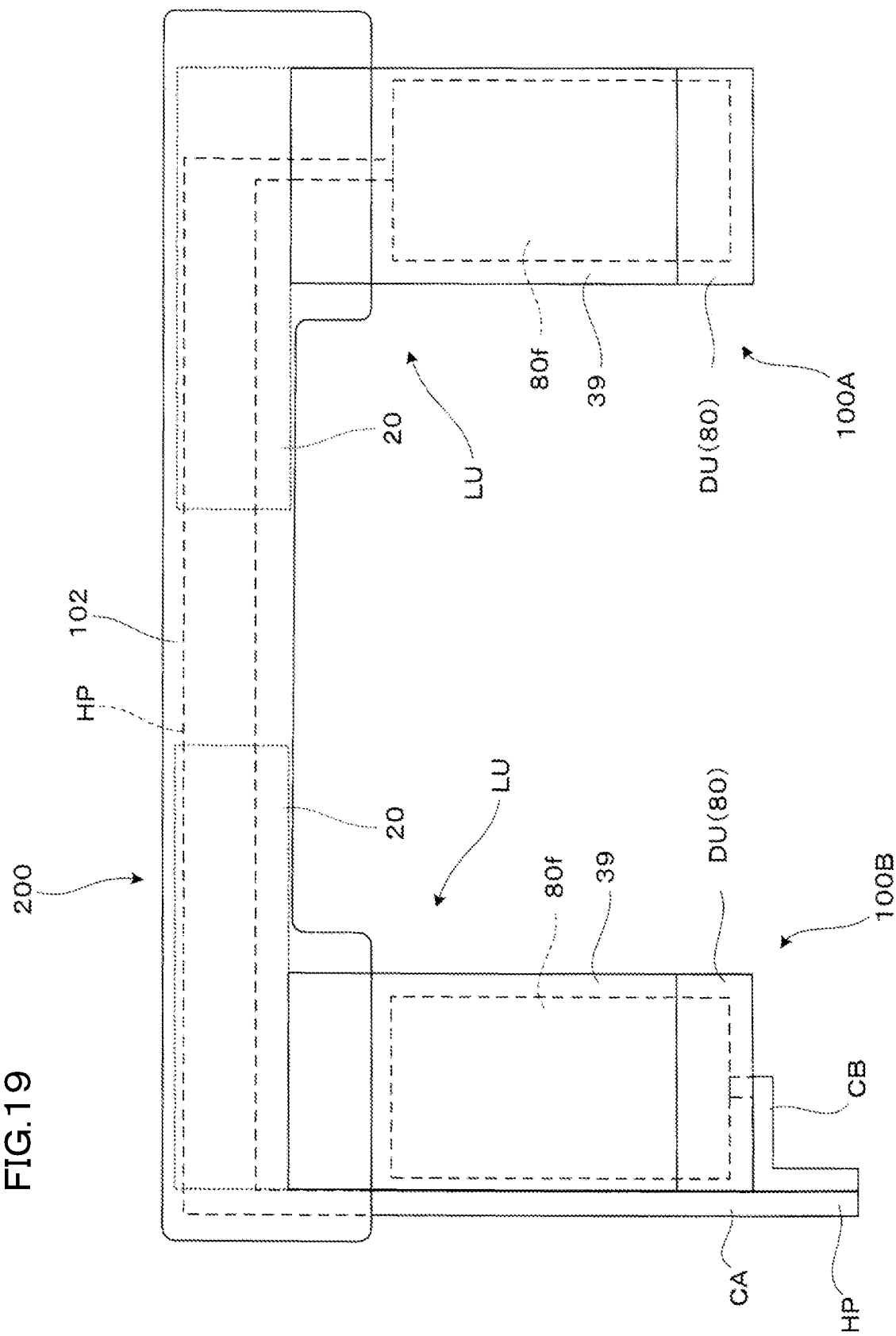
FIG. 19 is a conceptual diagram illustrating another modification example of the virtual image display apparatus.

FIG. 19 is a conceptual diagram illustrating another modification example of a virtual image display apparatus. A virtual image display apparatus 200 shown in FIG. 19 includes display device units DU and DU that include a pair of left and right image display device 80 and 80, and a harness member HP which is a cable portion provided along a frame portion 102 that supports a pair of right and left light guide devices 20 and 20 that respectively guides video light from display device units DU. In FIG. 19, FPC portions 80*f* and 80*f* that form the image display devices 80 and 80 are configured to be accommodated in cover-shaped exterior members 105*d* (see FIG. 1) together with respective portions such as a circuit board, a connection portion, or the like to be folded, for example, over portions from the image display devices 80 and 80 to the lens barrels 39 and 39.

For example, as shown in FIG. 1, the harness member HP is a cable portion that extends from one of the display devices 100A and 100B (extends from the display device 100B in FIG. 1), is connected to a control device or the like provided outside, and transmits a video signal from the control device to the pair of right and left display devices 100A and 100B. Further, inside the device, for example, as conceptually shown in FIG. 19, the harness member HP includes cables CA and CB which are divided toward the first display device 100A and the second display device 100B, and are connected to the image display devices 80 and 80 that respectively form the display devices 100A and 100B. The cables CA and CB are respectively connected to the FPC portions 80*f* and 80*f* of the image display devices 80 and 80, or connection circuits or the like provided in end portions thereof. That is, the cables CA and CB extend to be connected to the display devices 100A and 100B which are a pair of display portions. Here, the cable CA that extends toward the first display device 100A is provided along a metallic frame portion 102, and is in contact with the frame portion 102. With respect to the cables CA and CB that form the harness member HP, various materials, shapes, and dispositions may be considered, but here, as an example, the cables CA and CB have flat shapes, and are sealed by a copper foil tape, for example. With such a configuration, it is possible to provide high thermal conductivity to the cables CA and CB. Thus, for example, it is possible to dissipate heat from the FPC portions 80*f* and 80*f* over the entirety of the frame portion 102 through the harness member HP. In addition, for example, as shown in the figure, the cables CA and CB may be disposed to be directly in contact with the image display devices 80 (display device units DU), to thereby assist heat dissipation. Furthermore, as described above, in a case where the harness member HP is sealed by a copper foil tape or the like, it may be considered that only a part of the harness member HP is configured by the copper foil tape or the like. Specifically, for example, a configuration in which the harness member HP is configured by the above-mentioned copper foil tape or the like on the inside of the display devices 100A and 100B or in the vicinity thereof in the harness member HP that extends from a controller (not shown) which is a control device or the like provided outside may be considered. Thus, it is possible to prevent heat generated in the controller from being transferred from the harness member HP. Further, in a case where the harness member HP is entirely configured by sealing using a copper foil or the like up to a place including the controller, a member having low thermal conductivity such as an insulating film may be provided between the controller and the display devices 100A and 100B, in the harness HP, to block heat from the controller. Furthermore, for example, various forms may be considered with respect to interconnects of the cables CA and CB that form the harness member HP. Specifically, in the example shown in FIG. 19, a configuration in which each of the cables CA and CB are divided from a portion before connection to a corresponding one of the display devices 100A and 100B is shown, but instead, for example, a configuration in which a single cable extends up to the inside of one image display device 80 among the pair of right and left image display devices 80 and 80 without being divided into two and is divided into two inside the one image display device 80 and one of the two divided cables extends toward the other image display device 80 may be considered.

Figure 20:
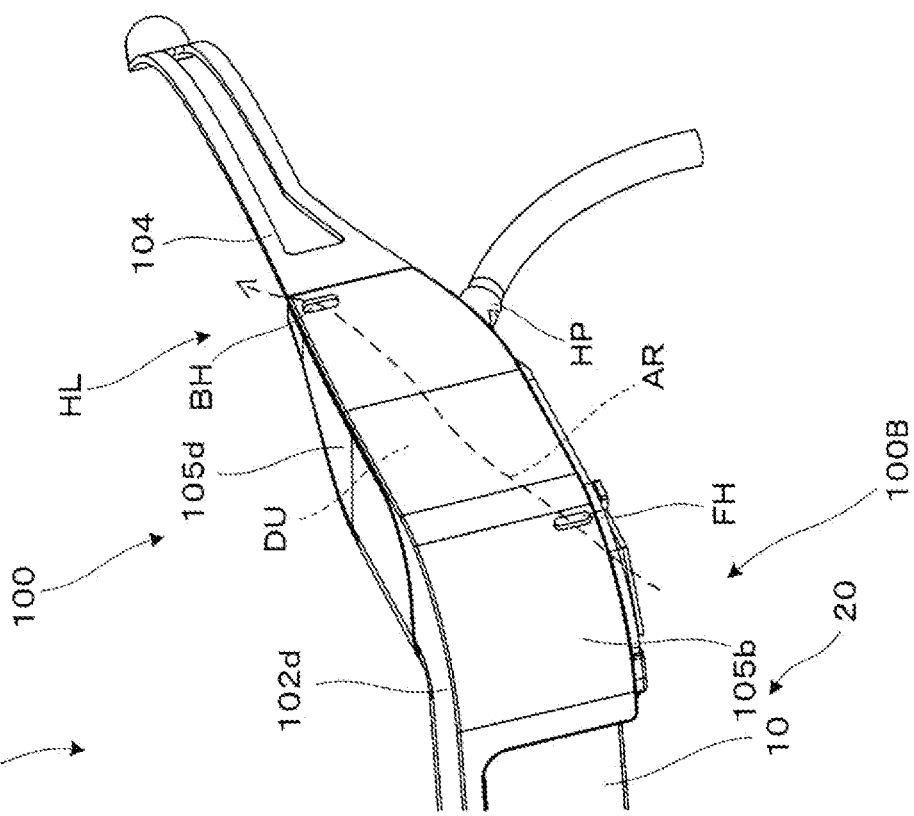
FIG. 20 is a diagram illustrating still another modification example of the virtual image display apparatus.

FIG. 20 is a diagram illustrating still another modification example of a virtual image display apparatus. In a virtual image display apparatus 300 shown in FIG. 20, an outside air flow path forming portion HL that forms a flow path for causing outside air to flow through a display device unit DU. More specifically, as shown in the figure, the outside air flow path forming portion HL includes an air hole FH provided on a front side of an exterior member 105d that accommodates the display device unit DU, and an air hole BH provided on a rear side thereof, in which a flow path is formed so that outside air AR flows from the air hole FH to the air hole BH. With respect to the outside air flow path forming portion HL, in addition to the shown example, various forms may be considered in consideration of suppression of generation of stray light, entrance of dust, or the like. As described above, by providing the outside air flow path forming portion HL so that outside air flows therethrough, it is possible to promote heat dissipation. Further, when a structure for flow-through of outside air as described above is provided, a water-proof structure may be separately provided as necessary. For example, a configuration in which a filter member (PTFE filter, or the like) through which air passes but water does not pass is provided in each of the air holes FH and BH which are ports of the flow path, or for example, a configuration in which a member or the like that forms an optical display unit LU is sealed in a space separated from the flow path for waterproof may be considered.

Figure 21:
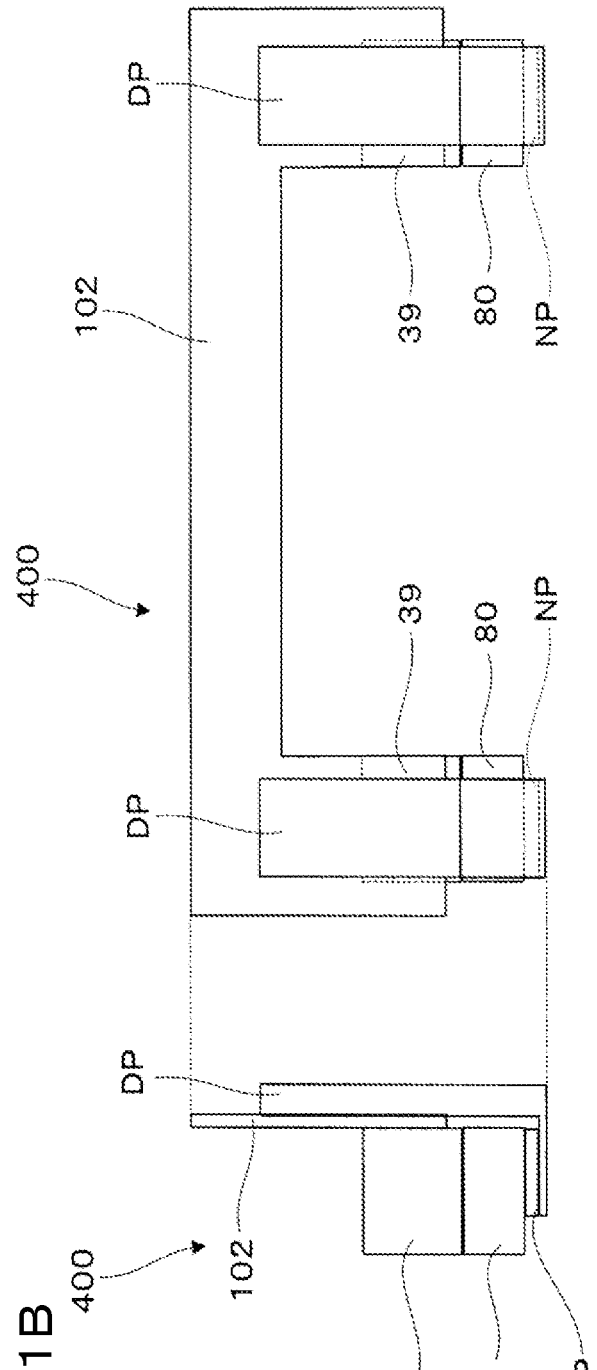
FIG. 21A is a conceptual plan view illustrating still another modification example of the virtual image display apparatus.
FIG. 21B is a side view thereof.
Figure 22:
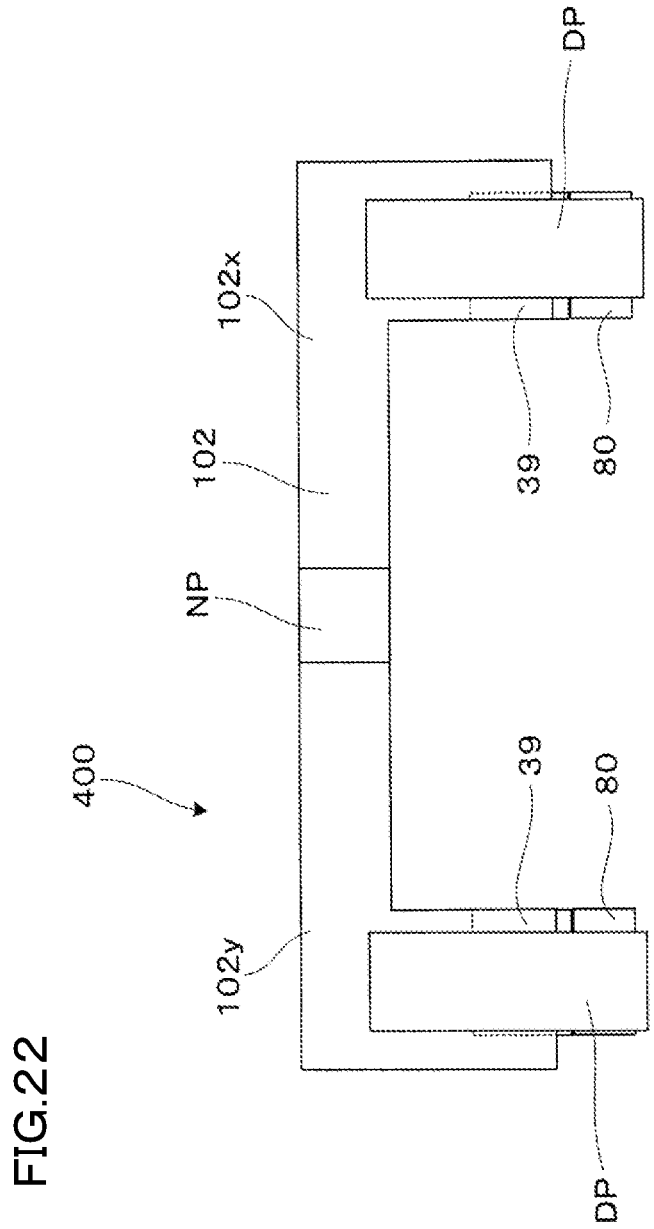
FIG. 22 is a conceptual plan view illustrating still another modification example of the virtual image display apparatus.

In addition, as a modification example, when a heat dissipating portion DP is provided as in a virtual image display apparatus 400 of which an inner structure is conceptually shown in FIGS. 21A and 21B, a noise countermeasure sheet NP may be provided. FIG. 21A is a conceptual plan view of the virtual image display apparatus 400, and FIG. 21B is a conceptual side view of the virtual image display apparatus 400. The virtual image display apparatus 400 includes the heat dissipating portion DP that extends from a rear surface side (back surface side) of an image display device 80 to a frame portion 102. That is, the heat dissipating portion DP functions as a thermal conductive member that dissipates heat. In a case where such a heat dissipating portion DP is provided, there is a concern that electromagnetic waves may be generated due to weak power or the like on a circuit board or the like of an organic EL panel that forms the image display device 80 and the electromagnetic waves may be changed to noise through the heat dissipating portion DP and may be transferred to other members to affect the other members. In order to prevent such a situation, herein, as shown in the figure, a configuration in which the noise countermeasure sheet NP is provided between the image display device 80 and the heat dissipating portion DP is used. As the noise countermeasure sheet NP, for example, a member such as an electromagnetic wave absorbing sheet made of a mixture of silicon polymer, magnetic metal power, and ceramics may be applied. In this case, it is possible to provide the noise countermeasure sheet NP with low thermal conductivity while securing thermal conductivity. As described above, by providing the noise countermeasure sheet NP, noise of an organic EL panel formed on a silicon substrate in the image display device 80 flows toward the frame portion 102 through the silicon substrate and the heat dissipating portion DP (for example, thermal conductive sheet), and thus, it is possible to prevent the noise from being transferred to a circuit board or the like of each of the display devices 100A and 100B, for example. Further, for example, the heat dissipating portion DP may be formed of a member having excellent thermal conductivity and electromagnetic wave absorption. Instead of the case shown in FIGS. 21A and 21B, for example, as shown in FIG. 22, a configuration in which a pair of frame portions 102 are provided so that two components of a first portion 102x and a second portion 102y are divided at a portion where left and right light guide members are retained and the noise countermeasure sheet NP is provided therebetween, to thereby prevent noise of the right and left display devices from being conducted, may be considered. Furthermore, a configuration in which a portion close to a circuit board, a flexible cable, or the like is covered with a noise countermeasure sheet (member having a low electrical conductivity) may be considered.

Others

The invention has been described with reference to the above-described embodiments, but the invention is not limited to the embodiments, and various modifications may be made in a range without departing from the concept of the invention.

In the above description, for example, the adhesive 88s to become the high thermal conductive adhesion portion BD, which is applied on the respective reference surfaces SF1 to SF3, is entirely over the contact places, but the adhesive 88s may be partially applied. Thus, for example, in the respective reference surfaces SF1 to SF3, places that are directly in contact with corresponding edge surfaces SS1 To SS3 without through the high thermal conductive adhesion portion BD may be present, to thereby achieve thermal conductivity. Further, a configuration in which the thermal conductive member 88h of the casing portion 88 is in contact with a part of, instead of the entirety of, the edge surfaces SS1 to SS3 of the silicon substrate SS using high thermal conductivity of the silicon substrate SS may be used.

Figure 18A:
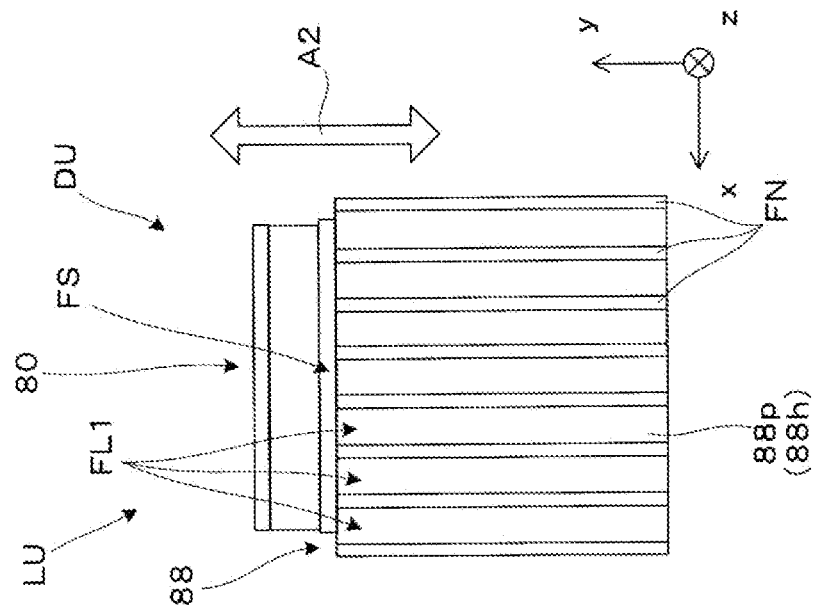
FIG. 18A is a perspective view illustrating a display device unit of a modification example.
Figure 18B:
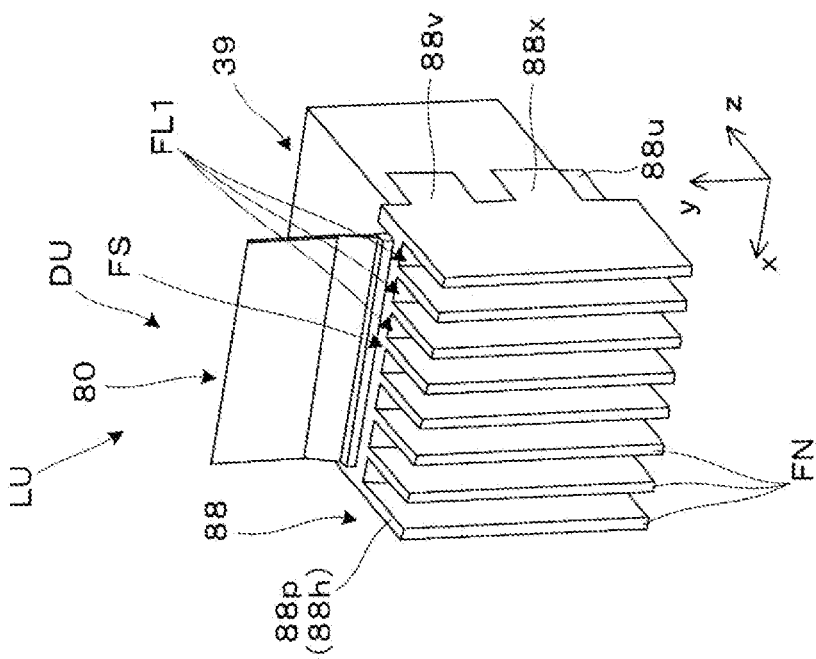
FIG. 18B is a rear view thereof.

In the above description, for example, in FIGS. 18A and 18B, the fin structure is provided, but the invention is not limited thereto. For example, the fin structure may be applied to other embodiments. Further, for example, various structures or means in which a cooling fan or Peltier element is provided may be used.

Further, other members that are directly or indirectly connected to the display device unit DU to perform thermal conduction, such as the lens barrel 39 or the like, may be formed of a metallic material, a filler-containing resin, a grapheme member, a heat pipe, or the like, for example.

In the above description, the element substrate of the image display device 80 is a silicon substrate, but other members such as quartz glass may be used as long as necessary heat dissipation and position accuracy can be secured.

In the above description, the casing portion 88 is formed of a metallic material having high thermal conductivity, but other materials (for example, a resin material) may be used (partially used) as long as heat dissipation or accommodation position accuracy of the image display device 80 can be secured.

In the above description, various devices may be used as the image display device 80, and for example, a configuration using a reflection type liquid crystal display device may be used, and a digital micro-mirror device or the like, instead of a video display device that includes a liquid crystal display device or the like, may be used.

In the above description, the half mirror layer of the second surface S12 is formed of a metallic reflecting film or a dielectric multi-layer film, but may be replaced with a flat or curved hologram element. Further, the fifth surface S15 may be formed using a hologram element instead of a mirror reflecting surface.

In the above description, the light guide members 10 or the like extend in a transverse direction where the eyes are arranged, but the light guide member 10 may be disposed to extend in a longitudinal direction. In this case, the light guide members 10 has a structure in which the light guide members 10 are not arranged in series but are arranged in parallel.

In the above description, only a form in which image light and external world light overlap is shown, but a virtual image display apparatus in which an image form based on image light and an image form based on external world light can be observed in a switchable manner without overlapping may be used.

The technique of the invention may be applied to a so-called video see-through product configured by a display and an imaging device.

The technique of the invention, that is, a casing (video device unit structure) having a structure for heat dissipation in unitization of an image display device (video device) may be used in a display device such as a camera finder or a small projector.

In the case of the other applications described above, for example, in a case where it is not necessary to perform high accuracy alignment with other optical parts with respect to a display device unit (video device unit), a configuration in which attachment portions (typically, protrusion members (fitting portions) 88u and 88v) for the alignment is not provided may be used.

The entire disclosure of Japanese Patent Application No.: 2016-025615, filed Feb. 15, 2016 and 2016-192990, filed Sep. 30, 2016 are expressly incorporated by reference herein.

What is claimed is:

1. A virtual image display apparatus comprising:
   a video device that includes a first surface emitting a video light and a second surface opposite to the first surface;
   a casing portion that accommodates the video device and that has an opening;
   a heat dissipating portion that dissipates heat from the video device;
   a light guide member that guides the video light from the video device; and
   a frame portion that supports the light guide member, wherein
   the casing portion exposes the second surface via the opening,
   a portion of the second surface to which the heat dissipating portion is attached is located inside the opening,
   the heat dissipating portion is a thermal conductive tape,
   the heat dissipating portion extends in a first direction,
   the first direction is from the second surface to the frame portion, and
   the first direction is not parallel with the second surface.

2. The virtual image display apparatus according to claim 1, further comprising:
   a half mirror that reflects a part of the video light and that transmits another part of the video light; and
   a projection optical system that projects the video light to the half mirror from the video device.

3. The virtual image display apparatus according to claim 1, wherein
   the video device includes an OLED element on a silicon substrate, and
   the second surface is a surface of the silicon substrate.

4. The virtual image display apparatus according to claim 1, wherein
   the casing portion includes a video device positioning portion that contacts with a place other than the second surface.

5. The virtual image display apparatus according to claim 1, wherein
   the video device includes a flexible printed circuit portion that is not overlapped with the thermal conductive tape.

6. The virtual image display apparatus according to claim 5, wherein
   the flexible printed circuit portion includes a thermal conductive material.

* * * * *